United States Patent
Iwasaki et al.

(10) Patent No.: US 9,118,854 B2
(45) Date of Patent: Aug. 25, 2015

(54) METHODS AND APPARATUS FOR PROVIDING OPTICAL BLACK COMPENSATION OF ADDED IMAGES

(71) Applicant: Olympus Imaging Corp., Shibuya-ku, Tokyo (JP)

(72) Inventors: Hiroaki Iwasaki, Hino (JP); Manabu Ichikawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 31 days.

(21) Appl. No.: 14/060,592

(22) Filed: Oct. 22, 2013

(65) Prior Publication Data

US 2014/0111674 A1 Apr. 24, 2014

(30) Foreign Application Priority Data

Oct. 23, 2012 (JP) ................................. 2012-233801

(51) Int. Cl.
*H04N 5/361* (2011.01)
*H04N 9/04* (2006.01)

(52) U.S. Cl.
CPC ............... *H04N 5/361* (2013.01); *H04N 9/045* (2013.01)

(58) Field of Classification Search
CPC ..... H04N 5/3655; H04N 5/361; H04N 5/378; H04N 5/374; H04N 5/2176; H01L 51/441; Y02E 10/549
USPC ........ 348/241, 243–245, 294–342; 250/208.1
See application file for complete search history.

(56) References Cited

U.S. PATENT DOCUMENTS

| | | | | |
|---|---|---|---|---|
| 7,760,258 | B2 * | 7/2010 | Huang et al. | 348/294 |
| 8,422,819 | B2 * | 4/2013 | Ise | 382/275 |
| 8,451,350 | B2 * | 5/2013 | Nozaki et al. | 348/243 |
| 8,537,253 | B2 * | 9/2013 | Ichikawa | 348/246 |
| 2004/0150729 | A1 * | 8/2004 | Nishizawa et al. | 348/243 |
| 2009/0135295 | A1 | 5/2009 | Kunishige et al. | |
| 2010/0039538 | A1 * | 2/2010 | Ikedo | 348/241 |
| 2010/0053380 | A1 * | 3/2010 | Ise | 348/241 |
| 2011/0037882 | A1 * | 2/2011 | Kukita et al. | 348/246 |
| 2012/0092533 | A1 * | 4/2012 | Komori | 348/251 |
| 2012/0273655 | A1 * | 11/2012 | Ise | 250/208.1 |
| 2014/0014818 | A1 * | 1/2014 | Cho et al. | 250/208.1 |
| 2014/0027611 | A1 * | 1/2014 | Patel | 250/208.1 |

FOREIGN PATENT DOCUMENTS

| | | |
|---|---|---|
| JP | 2003-110942 | 4/2003 |
| JP | 2005-117395 | 4/2005 |

* cited by examiner

*Primary Examiner* — Pritham Prabhakher
(74) *Attorney, Agent, or Firm* — John C. Pokotylo; Straub & Pokotylo

(57) ABSTRACT

An imaging apparatus for the present invention comprises an image sensor which repeatedly reads out image data, an OB calculating unit which calculates a representative value of OB output levels read from the image sensor; and a memory which stores the representative value of OB pixel output levels calculated by the OB calculating unit in a manner of dividing into a part for subtraction (a integer part) and a part for carrying-over (a decimal part); and an image synthesizing unit which sequentially adds the image data read from an effective pixel region in the image sensor and generates an added image, wherein the above-described image synthesizing unit subtracts the part for subtraction of the representative value of OB pixel output levels stored in the memory (OB subtraction part) from either the generated added image, or the image read from the effective pixel region, and, when a next OB value for addition after second addition is calculated, the OB calculating unit adds the carrying-over (decimal) part to the representative value of OB output levels stored in the memory for the representative value of OB output levels calculated using the image data read from the OB pixel regions.

6 Claims, 22 Drawing Sheets

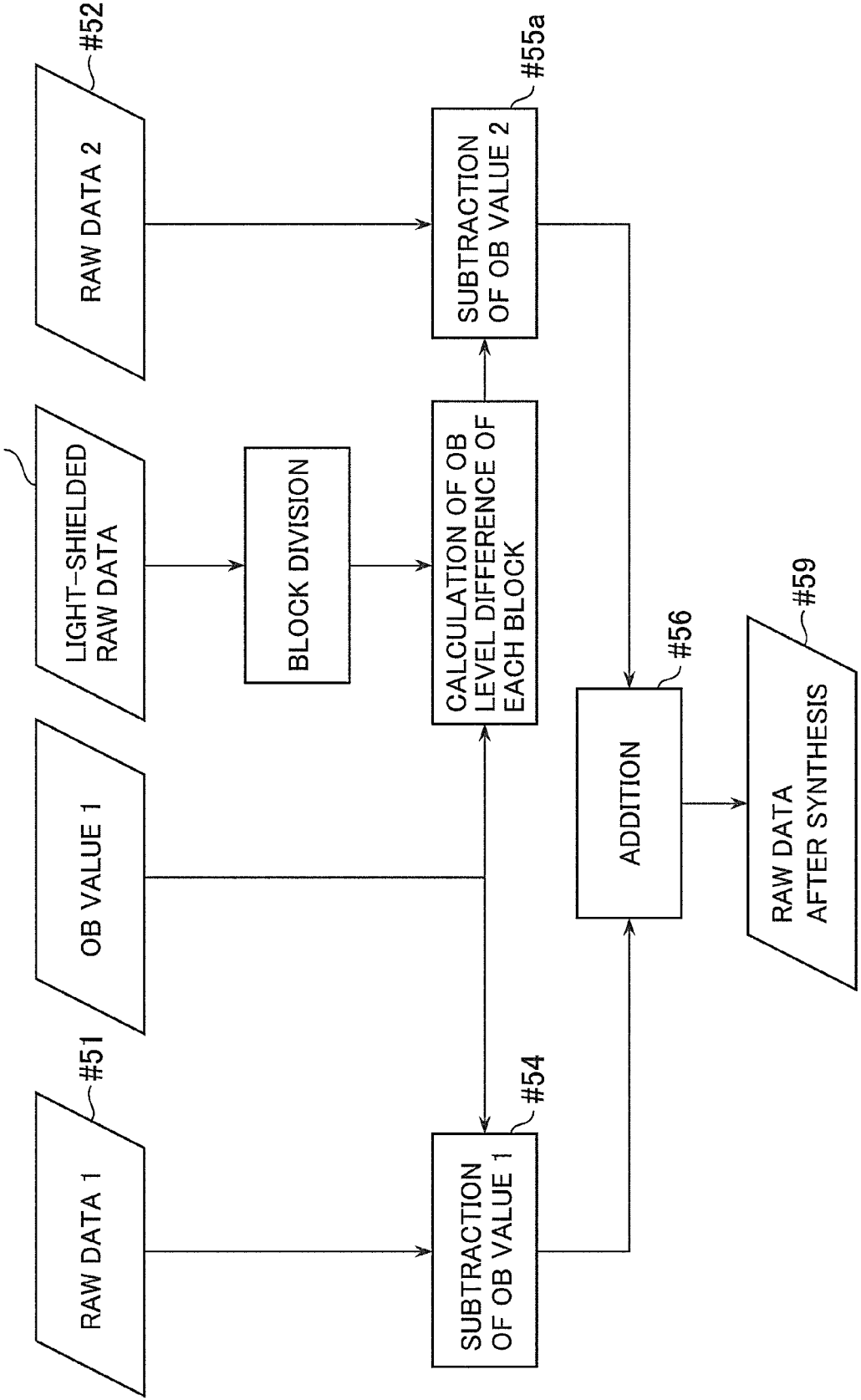

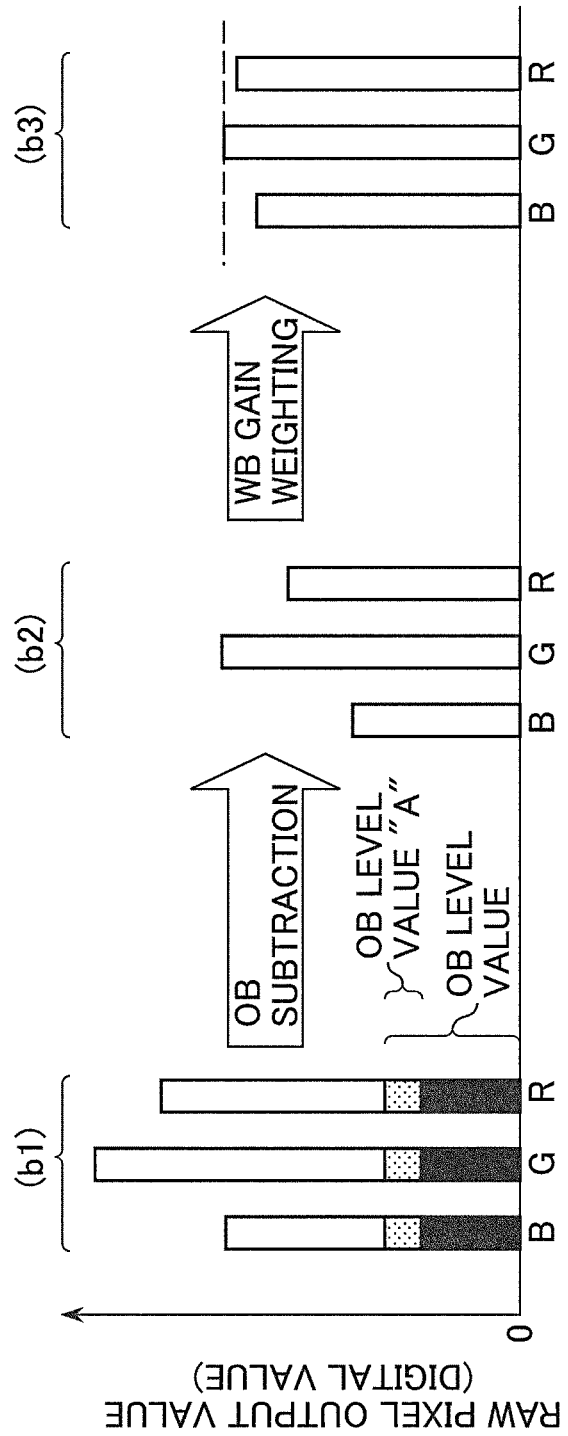

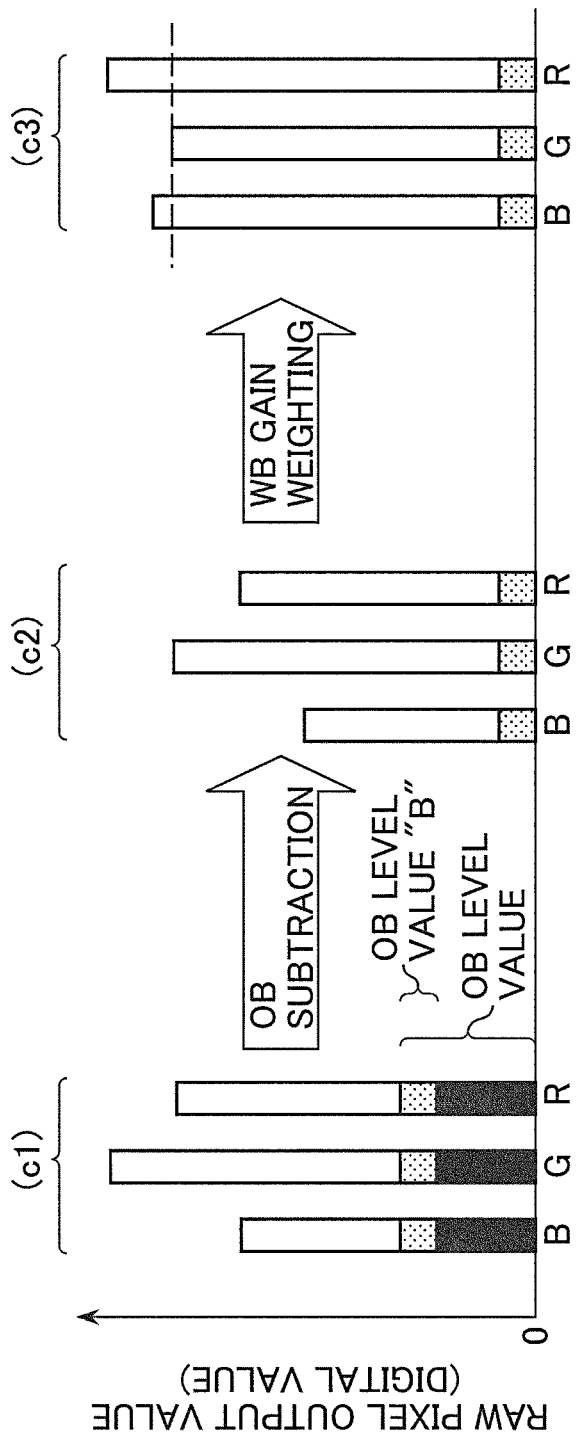

METHODS AND APPARATUS FOR PROVIDING OPTICAL BLACK COMPENSATION OF ADDED IMAGES

CROSS-REFERENCE TO RELATED APPLICATION

Benefit is claimed under 35 U.S.C. §119, to the filing date of prior Japanese Patent Application No. 2012-233801 filed on Oct. 23, 2012. This application is expressly incorporated herein by reference. The scope of the present invention is not limited to any requirements of the specific embodiments described in the application.

BACKGROUND OF THE INVENTION

1. Field of the Invention

This invention relates to an image pickup apparatus. Specifically, the image pickup apparatus adds image signal output repeatedly read from an image sensor of the image pickup apparatus whenever the image signal output is read out and generates an added image. Further, when the added image is generated, the image pickup apparatus can prevent color differences in the added image due to a black level error of an optical black signal level from an image pixel in an optical black region.

An image pickup apparatus has an image sensor, such as a CCD (charged-coupled device) and a CMOS (complimentary metal oxide semiconductor device), where a photodiode is provided in each pixel. The image sensor photo-electrically converts an object image to produce an image signal. It is known that a photodiode in a pixel of an image sensor has a dark current noise signal, and consequently an output voltage offset to a photoelectric conversion circuit which converts photoelectric current of the photodiode into voltage, even in a completely light-shielded state. Therefore the image sensor is commonly provided an optical black (hereinafter referred as to "OB") pixel region where light is physically shielded, in addition to an effective pixel region where an object image is formed. Output compensation of the image signal to remove dark current noise is performed by subtracting an average value of OB output levels calculated using OB pixel region output from photoelectric conversion output obtained from the pixels of the effective pixel region (Refer to JP2003-110942A, for example).

A destructive read-type image sensor is generally used as the image pickup apparatus in a digital camera. An accumulation level of a charge accumulating unit is reset after accumulated charge of a photodiode is read out. In this case, an image signal which has been accumulating until that moment during long-time exposure, such as bulb shooting, is displayed so that an image signal exposed at a predetermined time interval is read out first, and image signal addition is performed whenever the image signal is read out. Next, an added image obtained in this way is displayed on a display unit (Refer to JP2005-117395, for example).

With respect to the image pickup apparatus using the above-described techniques, OB compensation is performed from the image signals as described above to obtain the added image of bulb shooting, and the like. However, a slight error of the OB image signal occurs when addition is performed. Consequently, whenever addition is repeatedly performed, these slight errors are accumulated and cause color differences to occur in the added image at the end of shooting.

The occurrence of the color differences will be described using FIGS. 20A-C. Generally, the image sensor has Bayer-array color filters to obtain three color light components of R (red), G (green), and B (blue). Object light passes through the color filters of RGB and then is photo-electrically converted by the photodiode of a pixel corresponding to each color. A weighting operation of each color output is performed based on the photoelectric conversion signal to obtain a mixed luminance signal (black and white) and a color-difference signal for color reproductivity. For example, when white light is incident, only the luminance signal is a finite value and color-difference signal is zero. At that time, proportion of the signals corresponding to the R, G and G pixels is a color balance value with respect to white light. Each image sensor has a specific proportion.

When incident light is not white, the portion of the color signals of R, G, and B pixels differs from that of white light and so the image has colors. Generally, it is necessary to adjust dynamic range of R, G, and B pixel signals. Therefore, in case of a white object, a weighting operation is performed by a white balance gain in such a manner that a ratio of quantized R, G, and B pixel signals is 1:1:1.

Take as an example a situation where R, G, and B pixel signals are output as shown in FIG. 20A (a1). Here each R, G, and B pixel signal includes OB values of the effective pixel region. If image compensation is performed by subtracting an OB pixel output value from a photoelectric conversion signal of the effective pixel region, values of the R, G, and B pixel signals are as shown in FIG. 20 A (a2). A white balance (hereinafter referred as to "WB") gain for a B signal is g/b and that for an R signal is g/r. If the B and R signals are weighted by the white balance gain, respectively, the values of the R, G, and B pixel signals become the same as shown in FIG. 20 A (a3). The resulting image data becomes achromatic, which means that white balance processing has been properly performed.

FIG. 20 A is an example where the average value of OB output levels is equal to the OB pixel value of the effective pixel and a proper value has been used. However, as shown in FIG. 20 B, if the average value of OB output levels and the OB pixel value of the effective pixel differ each other and the average value of OB output levels includes an extra OB value "A" for the OB value of the effective pixel (Refer to FIG. 20 B (b1).), white balance processing is not properly performed. Specifically, if OB compensation is performed by a larger average value of OB output levels than the OB value of an effective pixel in the object image which is actually taken, the R and B signals from the effective pixel region become smaller than they are (Refer to FIG. 20 B (b2).). If a weighting operation is performed by a WB gain and white balance is corrected in this situation, the G signal becomes too large relative to that of the B and R signals as shown in FIG. 20B (b3), and the entire image becomes greenish.

Alternatively, as shown in FIG. 20C, if the average value of OB output levels is smaller than the OB value of the effective region by an OB value "B" (Refer to FIG. 20 C (c-1).) (that is, if OB compensation is performed by a smaller average value of OB pixel levels than the OB value of an effective pixel in the object image which is actually taken), the R and B signals from the effective pixel region become larger than they are (Refer to FIG. 20C (c2).). If a weighting operation is performed by a WB gain and white balance is corrected in this situation, the B and R signals become too large relative to that of the G signal as shown in FIG. 20C (c3) and the entire image becomes magenta.

The average value of OB output levels is an average value of output levels of a plurality of the OB pixel regions which are disposed on the image sensor and completely light-shielded, and consists of an integer part and a decimal part. Generally, OB compensation is performed by subtracting the integer part of the output level in the OB pixel region from that of the output level in the effective pixel region. A value of the decimal part corresponds to the OB value "A" or the OB value "B" in FIGS. 20 B and C, respectively. Color differences in an image are caused by the value of the decimal part because only the integer part is used for OB compensation. If OB compensation is repeatedly performed to obtain the added image, especially during bulb shooting, slight errors caused by ignoring the decimal parts during OB compensation are accumulated and then color differences become noticeable.

The invention aims at providing an image pickup apparatus which has a function of displaying an image which has been accumulating until that moment, and preventing color differences in the added image in long-time exposure such as bulb shooting.

SUMMARY OF THE INVENTION

To achieve the above-described purpose, the image pickup apparatus of a first example embodiment consistent with the present invention comprises:

1) an image sensor which repeatedly reads out image data;
2) an OB calculating unit which calculates a representative value of OB output levels read from the image sensor;
3) a memory which stores the representative of OB pixel output levels calculated by the OB calculating unit in a manner of dividing into a part for subtraction (a integer part) and a part for carrying-over (a decimal part); and
4) an image synthesizing unit which sequentially adds the image data read from the effective pixel region in the image sensor and generates an added image, wherein the above-described image synthesizing unit subtracts the part for subtraction of the representative value of OB pixel output levels stored in the memory (OB subtraction part) from either the generated added image, or the image read from the effective pixel region, and, when a next OB value for addition after second addition is calculated, the OB calculating unit adds the carrying-over (decimal) part to the representative value of OB output levels stored in the memory for the representative value of OB output levels calculated using the image data read from the OB pixel regions.

BRIEF DESCRIPTION OF THE DRAWINGS

FIG. 17 is a diagram showing a procedure for synthesizing RAW image data in the camera according to the fourth embodiment of the invention.

FIGS. 20A-C are diagrams explaining operations of traditional OB compensation.

DESCRIPTION OF THE PREFERRED EMBODIMENTS

Example embodiments applied to a camera will be described in the following in accordance with the drawings. An example of a camera 100 according to the preferred embodiments of the invention is a digital camera which converts a photographed object image into an image signal and acquires image data based on the image signal. The camera has a photographing unit, a display unit 22, and an operation unit 23. The photographing unit of the camera converts an object image into image data. The display unit 22 of the camera is arranged on a rear surface of a camera body, for example. The display unit 22 displays the object image based on the image data converted by the photographing unit. A user views a live view image displayed in the display unit 22 of the camera, determines a photographic composition and a shutter opportunity in response to the displayed object and then performs a release operation for instructing photography to the operation unit of the camera. When the user performs the release operation, the camera records the image data acquired by the photographing unit in a recording medium. When receiving an input operation for a playback mode by the user to the operation unit, the camera (specifically, a system control unit) reads out the image data recorded in the recording medium and displays the read image on the display unit 22.

The camera can perform bulb shooting by determining start and end times to accumulate the object image based on a user's decision. Further, the user can set a display mode to display process during bulb exposure (hereinafter referred as to "Live BULB mode"). In the Live BULB mode, the digital camera reads out the image data from the photographing unit during bulb shooting at a predetermined time interval or at a time interval calculated by the camera on a basis of the object, photographic sensitivity, and the like. The camera 100 generates an added image of the read-out image data and displays the added image on the display unit 22.

First Embodiment

Figure 1:
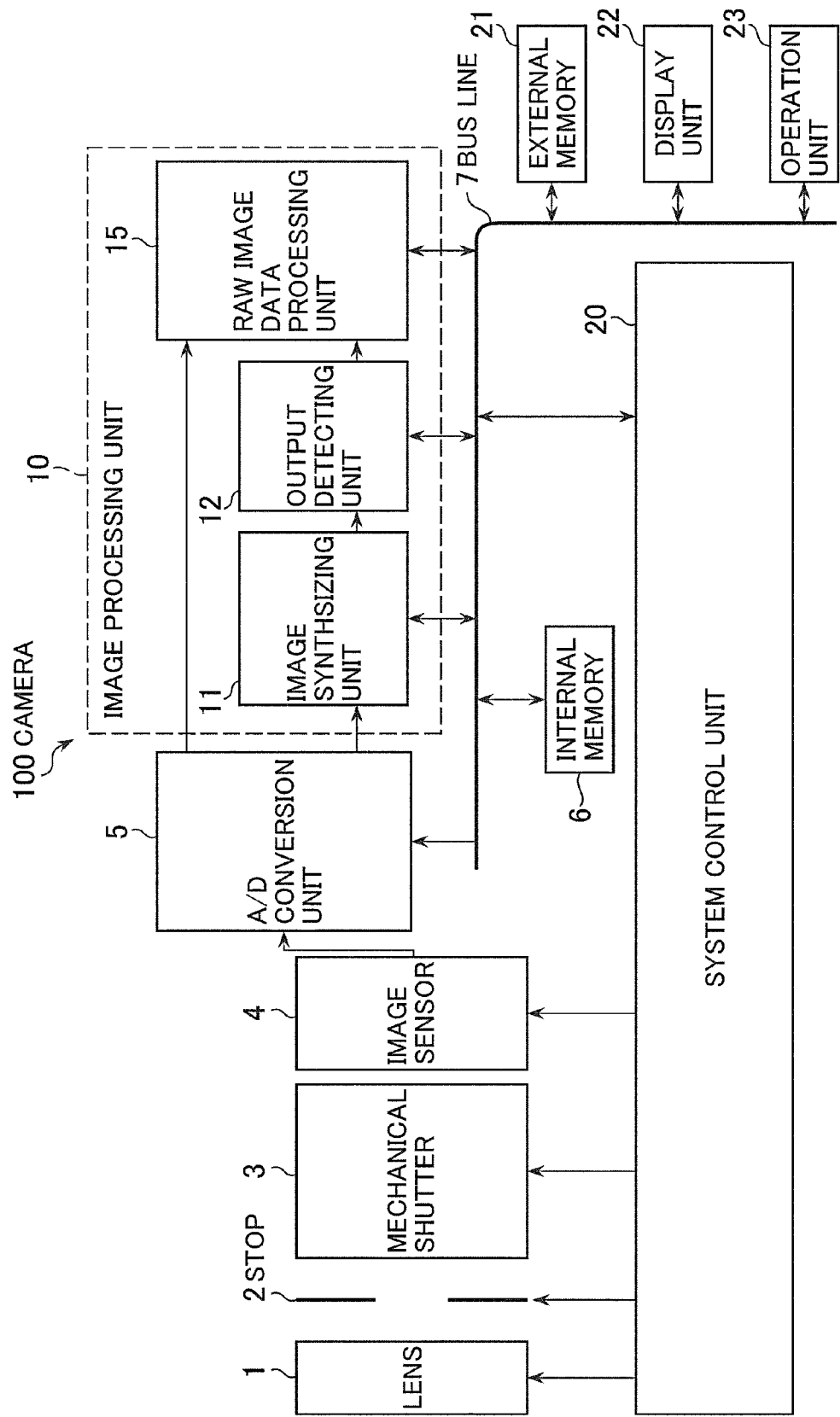
FIG. 1 is a block diagram mainly showing an electrical structure of a camera according to a first embodiment of the present invention.

FIG. 1 is a block diagram mainly showing an electrical structure of the camera according to the first example embodiment consistent with the invention. The camera 100 includes a lens 1, a stop 2 (or aperture, or diaphragm), a mechanical shutter 3, and an image sensor 4 as a photographing unit. The lens 1 typically includes a plurality of optical lenses for forming an optical image of an object (an object image) and is either a single-focus lens or a zoom lens by which focal length is changeable. A focus lens constitutes the lens 1, a focus lens and a lens drive mechanism (not shown). The focus lens moves along an optical axis direction to perform focusing.

The stop 2 is disposed behind the lens 1 or in a lens group constituting the lens 1. The stop 2 includes a mechanism to change the F number (commonly referred to as "f-stop") and an amount of transmitted light is changeable by changing the F number with respect to luminous of the object which has transmitted through the lens 1. The mechanical shutter 3 is disposed behind the stop 2 and opens and closes with respect to object light which has transmitted through the lens 1. The mechanical shutter 3 is open and closed to perform exposure and shield light to the image sensor 4 and controls time of opening and closing operations to control a shutter speed. Alternatively, or in addition, an electronic shutter (not shown) may be provided.

The image sensor 4 is arranged on the optical axis of the lens 1 and at a position where the object image is formed. The image sensor 4 converts the object image formed by the lens 1 into an image signal and then outputs the image signal. The image sensor 4 has photodiodes which constitute individual pixels arranged two-dimensionally in a matrix shape. Each photodiode generates photoelectric conversion current in accordance with received light amount. The photoelectric conversion current is accumulated as electrical charges by a capacitor connected to each photodiode.

The image sensor 4 sequentially reads out an electrical signal where an electric charge is stored in the two-dimensionally arranged pixels at a predetermined period, repeatedly, to convert the object image into an analog image signal. Color filters are arranged on individual R (red), G (green), and B (blue) pixels of the image sensor 4. The image sensor 4 outputs analog image data of the R, G, and B pixels for conversion of the object image. The analog image data is output to an analog/digital (A/D) conversion unit 5.

A sensor surface of the image sensor 4 includes an effective pixel region and an OB pixel region as described later. (Refer to FIG. 4.) The effective pixel region photo-electrically converts the object image and outputs the image data. The OB pixel region, where light is physically completely shielded, outputs OB pixel value(s). The image sensor 4 is constituted of a solid-state imaging device, for example, a CCD image sensor which obtains an image signal by sequentially transferring the accumulated charge of the pixels, or a CMOS image sensor which has a charge amplifier circuit for converting the accumulated charge into voltage for each pixel and sequentially transfers a voltage signal is used for the solid-state imaging device. Alternatively, the image sensor 4 is not limited to a type where the RGB color filters are used for each pixel and may be a stacked-type image sensor by which RGB signals are obtained using transmission characteristics of light in the image sensor.

The A/D conversion unit 5 inputs the analog image signal output from the image sensor 4 and then converts the received analog image signal into a digital image signal. The digital image data comprises luminance data digitalized into color components of RGB. The digital image data converted by the A/D conversion unit 5 is output to an image synthesizing unit 11 and a RAW image data processing unit 15, both included in an image processing unit 10.

The image synthesizing unit 11, an output detecting unit 12, and the RAW image data processing unit 15 are disposed in the image processing unit 10. These units are connected to a system control unit 20 via a bus line 7, and input and output various data such as image data, control instructions, and the like, between the system control unit 20. The bus line 7 is not limited to an electrical signal transmission line, and may be an optical transmission line, for example.

The image synthesizing unit 11 generates an added image data by adding to a previously stored added-image, next digital image data read from the image sensor 4 at a predetermined time interval and A/D converted. (The image signal is RAW pixel data.) More details about this addition operation will be described later using FIG. 4.

Output from the image synthesizing unit 11 is connected to the output detecting unit 12. The output detecting unit 12 detects a luminance level of the added image data synthesized by the image synthesizing unit 11, temporal changes of the luminance level, luminance distribution of the imaging region, and the like. The luminance level is obtained by calculating black and white components from RGB luminance of the added image data.

By auto exposure (AE) operation of the system control unit 20, an average luminance of the entire object image or a luminance in a specific area specified by the user, for example, a maximum luminance or an average luminance in a specific area is obtained. The output detecting unit 12 detects the added image data added by the image synthesizing unit or a pixel data level of the added image data.

Output from the output detecting unit 12 and the A/D conversion unit 5 are connected to the RAW image data processing unit 15. The RAW image data processing unit 15 develops the image data synthesized by the image synthesizing unit 11 or the data digitalized by the A/D conversion unit 5. The image data output from the A/D conversion unit 5 and the output detecting unit 12 have not been processed and compressed yet and are RAW data. The RAW image data processing unit 15 performs de-mosaic process, white balance adjustment, gamma compensation, image compression, and the like as a compression process.

An internal memory 6 may include a non-volatile memory such as a flash memory and stores necessary various setting information for camera operations, as well as temporarily image data during image processing. The added image data is also temporarily stored in the internal memory 6. A memory for temporary storage may be a volatile memory.

An external memory 21 is a non-volatile memory, which may be built into the camera 100 or can be removeably loaded into the camera 100. The external memory 21 records the image data developed by the RAW image data processing unit 15.

The display unit 22 is constituted of an electronic viewfinder (EVF), such as TFT and organic EL, and arranged on a rear surface of the camera 100. The display unit 22 performs live view display at the time of shooting, playback display of taken images data, and display of a menus screen(s) for setting or checking photographing parameters, and the like. When the Live BULB mode is set, the added image during exposure is displayed on the display unit 22. When displaying the image data on the display unit 22, the image processing unit resizes the image data to conform to the display pixels of the display unit.

The operation unit 23 includes various operation members, such as a release button, an OK button, a cross-key button, a power supply button, and a playback button (not shown), and is operated by the user. The release button is capable of detecting two operation states of the button, i.e., a half-pressed state and a full-pressed state. Specifically, if the release button is pressed down halfway, a first release switch is turned on and the camera executes shooting preparation such as auto-exposure, auto-focus, etc. If the release button is pressed down fully, a second release switch is turned on and the camera takes a picture. The cross-key button includes four buttons (up, down, left, and right) and is used in changing a cursor position on a camera control screen or the menu screen displayed on the display unit 22. The OK button is used in setting an item of the cursor position selected by the cross-key button the in response to the user's operation. Alternatively, or in addition, the operation unit 23 may include a touch sensitive panel provided over the display unit 22.

The system control unit 20 executes overall control for the camera 100 based on a program stored in the internal memory 6. When receiving a user's instruction via the operation unit 23, the system control unit 20 controls the image sensor 4 to capture an image, performs timing control (for example, for reading the image signal and opening/closing the mechanical shutter 3), controls the lens 1 to perform autofocus and the stop 2 to adjust aperture, and the like. Additionally, the system control unit 20 controls the display unit 22 to display the live view image, the live bulb image at the time of bulb shooting, and the like based on the image data processed by the image processing unit 10 and the external memory 21 to record the image data.

Next, bulb shooting operation according to the embodiment will be described using a flowchart shown in FIG. 2. Flows shown in FIG. 2 and FIGS. 3, 8, 12, 16, and 19 (described later) are executed by the system control unit 20 based on the program stored in the internal memory 6.

According to the first example embodiment, the user can select (A) normal bulb shooting mode in which live bulb image display (an image which is being taken is displayed during bulb shooting) is not performed, or (B) Live BULB mode in which the live bulb image display is performed. If the user is used to bulb shooting and is concerned with the possibility of image deterioration due to reading the image from the image sensor 4 repeatedly and the repeated addition operations, the user can select the normal bulb shooting mode. On the other hand, the user can select the Live BULB mode to help them determine the timing for stopping exposure and/or perform image processing such as exposure compensation for a partial or whole of the object image to obtain an image which coincides with the user's intention, while viewing live bulb image display which is being taken.

In advance of bulb shooting, the user views live view image displayed on the display unit 22 of the camera 100 or an optical finder (not shown) to determine a photography composition for a situation of the object by adjusting orientation of the camera or a focal length of the lens (zoom). Additionally, in the following discussion of FIG. 2, it is assumed that the user selects the Live BULB mode, sets F number of the stop 2 and sets a photographing function such as ISO speed of the image sensor 4 by the operation unit 23, if necessary.

Figure 2:
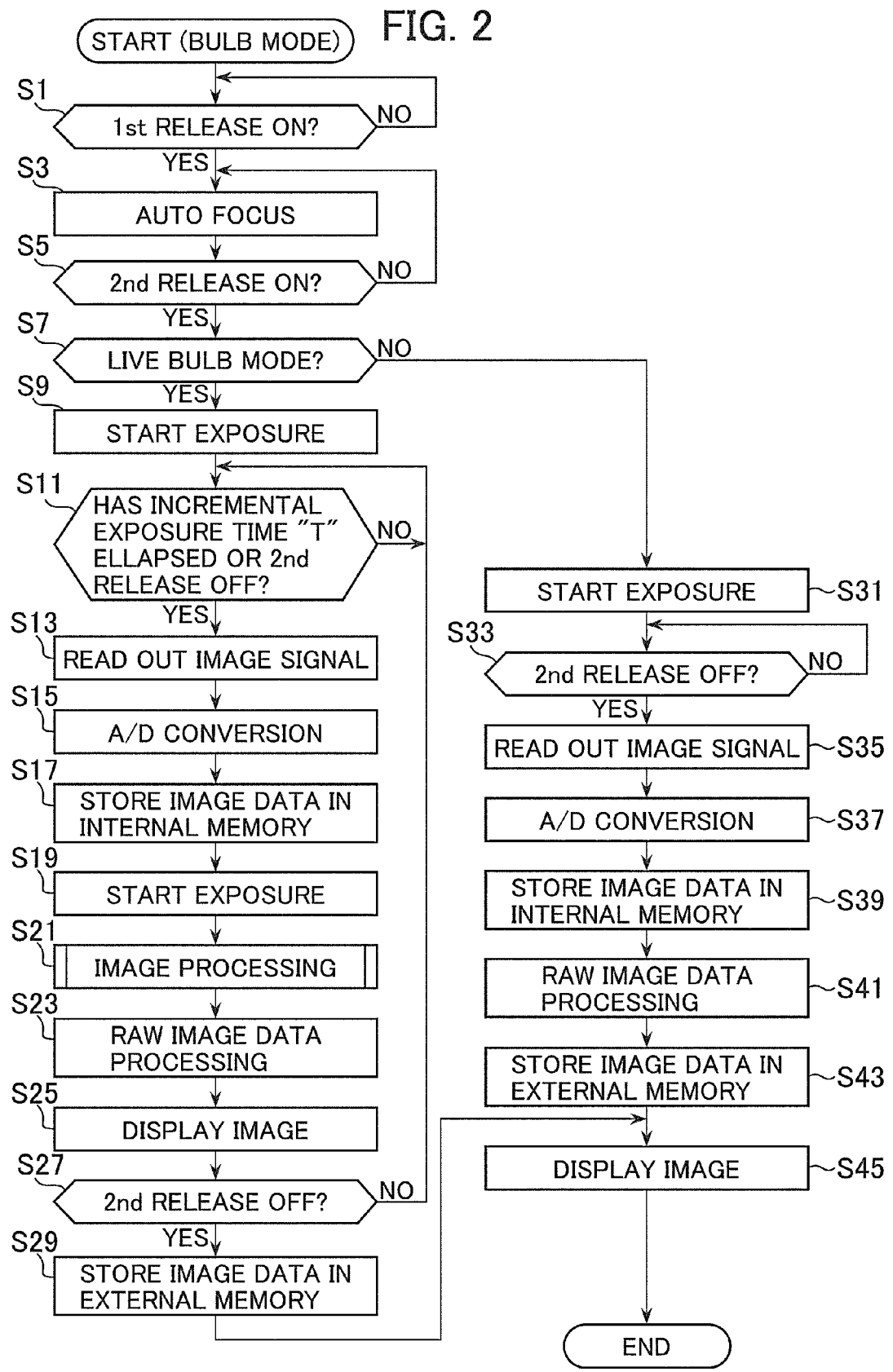
FIG. 2 is a flowchart showing operations of the camera in a bulb shooting mode according to the first embodiment of the invention.

If a flow of the bulb mode shown in FIG. 2 is started in response to the user's operation, it is first determined whether or not the first release switch has been turned on (S1). Here determination is carried out based on detection by the system control unit 20 whether the release button is pressed halfway and the first release switch is on. If the result of this determination is that the first release switch is not on, the camera enters a standby state to await start of shooting. (The process returns to determination of step S1.)

If the result of determination in step S1 is that the first release switch is on, the camera performs autofocus (AF) operation for the object image (step S3). Here the system control unit 20 performs AF operation. In the AF operation, the system control unit 20 obtains the image data repeatedly read from the image sensor 4. Next, the focus lens of the lens 1 focuses on the object so that a contrast representing brightness difference included in the image is a maximum. AF operation is not limited to contrast AF and phase shift AF using a phase shift sensor may be adopted instead, or in addition.

After AF operation in step S3, it is determined whether or not the second release switch is on, in other words, whether the release switch is fully pressed down, in response to the user's operation (step S5). Here determination is carried out based on detection by the system control unit 20 whether the release button has been fully pressed from the half-pressed state. If the result of this determination is that the second release switch is not on, the camera enters the standby state to await start of shooting based on detection of the second release switch (The auto focus of step S3 and the determination step of step S5 is repeated).

If the result of determination in step S5 is that the second release switch is on, it is determined whether or not the Live BULB mode has been set (S7). The Live BULB mode is set by the user in advance via a menu screen, for example, as described above. If the result of determination in step S7 is that the Live BULB mode has been set (step S7: Yes), live bulb shooting is executed with the live bulb image being displayed at and after step S9. On the other hand, if the result of determination in step S7 is that the Live BULB mode has not been set (step S7: No), the normal bulb shooting is executed at and after step S31. In the normal bulb shooting, the image signal is not read from the image sensor 4 in order to display the process during shooting and so the live bulb image is not displayed.

If the result of determination in step S7 is that the Live BULB mode has not been set, exposure is started (S31). Here, the system control unit 20 instructs the image sensor 4 to start charge accumulation based on a photoelectrically-converted photoelectric current signal and then exposure is started.

When exposure is started, it is determined whether or not the second release switch has been turned off in response to the user's operation (S33). Once the user fully presses down the release button and bulb shooting is started, the release button is kept being fully pressed during bulb shooting. In order to end bulb shooting, full pressing of the release button is released, e.g., a finger is taken away from the release button. Here, it is determined whether or not the second release switch is off. If the result of determination is that the second release switch is on (step S33: No), bulb shooting is continued. The image signal is not read from the image sensor 4 during bulb shooting and so the live bulb image is not displayed.

If the result of determination in step S33 is that the second release is off (step S33: Yes), the image signal is read out (S35). Here the system control unit 20 instructs the image sensor 4 to read the image signal from the image sensor 4 and then the image signal is read out.

After analog image signal is read from the image sensor 4 at step S35, A/D conversion is performed (S37). Here the read-out analog image signal is output to the A/D conversion unit 5 and then converted into digital image data by the A/D conversion unit 5.

After A/D conversion is completed at step S37, the digital image data A/D converted at step S37 is stored in the internal memory 6 (S39). Subsequently RAW image processing process is performed (S41) to generate RGB camera image data from a digitalized image data that was output from a image sensor and converted from analog to digital. Here the image data in a RAW data format is processed by the RAW image data processing unit 15.

After RAW image processing process is completed, the image data is stored in the external memory 21 (S43). Here the image data processed at step S41 is stored in the external memory 21. Sequentially image display is performed (S45). Here the processed image data is displayed on the display unit 22. From steps S31 to S45 in the normal bulb shooting, the live bulb image obtained by bulb shooting is not displayed from start to end of bulb shooting. It is not until step S45 that the taken image is displayed for the first time.

Returning to step S7, if the result of determination in step S7 is that the Live BULB mode has been set (step S7: Yes), exposure is started (S9). Here the system control unit 20 instructs the image sensor 4 to start charge accumulation and then exposure is started. Additionally, when exposure is started, exposure increment time "T" is set corresponding to a time period for displaying the live bulb image on the display unit 22. The exposure increment time "T" is an initial setting value previously held in the camera 100, a time set by the user via operation unit 23, or a time automatically set in accordance with the object brightness and the like.

After the exposure is started, it is determined whether or not the exposure increment time "T" has elapsed or the second release is off (S11). If the result of determination is that the exposure increment time "T" has not elapsed or the second release is not off (step S11: No), exposure is continued until the exposure increment time "T" has elapsed or the second release switch is off If the result of determination in step S11 is that the exposure increment time "T" has elapsed (step S11: Yes), the image data whose electrical charge has been accumulated during the exposure increment time "T" is read from the image sensor (S13). Here the system control unit 20 instructs the image sensor 4 to read the image data from the image sensor 4 and then the analog image signal is read out.

After the image data is read, A/D conversion is performed (S15). Here the analog image data read from the image sensor 4 is output to the A/D conversion unit 5 and then converted into digital image data by the A/D conversion unit 5. After A/D conversion is completed at step S15, the digital image data A/D is stored in the internal memory 6.

After the image data is stored in the internal memory, exposure is started again (S19). Here the system control unit 20 instructs the image sensor 4 to start charge accumulation and then exposure is started as same as step S9. Additionally, the exposure increment time "T" is reset and then time count is restarted. Capturing a next frame is started immediately after the image data of a frame read from the image sensor 4 is stored in the internal memory 6. As a result, it is possible to shoot continuously with minimum time intervals between frames.

Figure 20A:
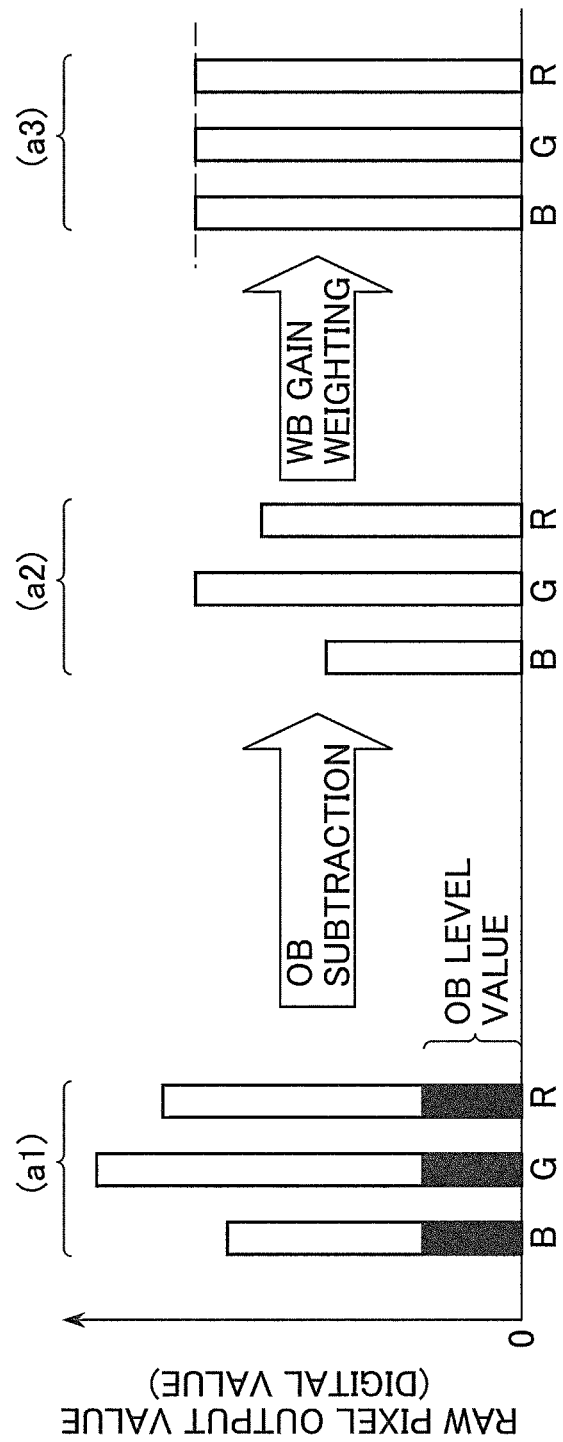

After exposure is started at step S19, image processing is performed (S21). Here synthesis of an added image is performed by the image synthesizing unit 11. Specifically, at each time the image signal is output from the image sensor 4, the system control unit 20 adds the image data read out earlier to the add imaged stored in the internal memory 6 and then records the added image data in the internal memory 6 again. The added image data is used as synthesized image data displayed on the display unit 22 in the Live BULB mode. The OB pixel output is subtracted from R, G, and B pixel output, respectively when the addition operation is performed, as described above using FIGS. 20A-C. More details about the synthesis operation of the added image will be described later using FIGS. 3 and 7.

After image processing is completed, RAW image data is converted (S23). Here the RAW image data processing unit 15 processes the RAW image data of the added image synthesized by the image synthesizing unit 11.

After the RAW image data process is completed, image display is performed (S25). Here the live bulb image during live bulb shooting is displayed based on the digital image data processed at step S23. The user views the live bulb image to check a progress of bulb shooting and to determine timing whether to continue or end the bulb shooting, for example.

After the live bulb image display is performed, it is determined by the system control unit 20 whether or not the second release switch has been turned off in response to the user's operation (S27), as with step S33. As described above, the live bulb image is displayed on the display unit 22 at each exposure increment time "T". The user views the live bulb image and a finger is taken away from the release button when determining end of bulb shooting. If the result of determination is that the second release button is on (step S27: No), the process returns to step S11 and bulb shooting in the Live BULB mode is continued. On the other hand, if the result of determination in step S27 is that the second release button is off, (Step S27: Yes) the image data is stored in the external memory 21 (S29).

The image data is stored in the external memory 21 at step S29 or a captured image of bulb shooting is displayed at step S45 and then the flow of bulb shooting is completed.

The flowchart of FIG. 2 assumes a global shutter operation in which all pixels in the image sensor 4 are electrically exposed for the same time. However a rolling shutter operation, in which electric charge from the pixels is sequentially sent to shielded accumulation regions row by row and read out, may be applicable. If the rolling shutter operation is applied, while charge from the pixels is sent to shielded accumulation regions row by row, a next exposure is started at pixels of a row in which charge is sent to the accumulation regions, and so an operation for starting a next exposure at step S19 is unnecessary.

Figure 3:
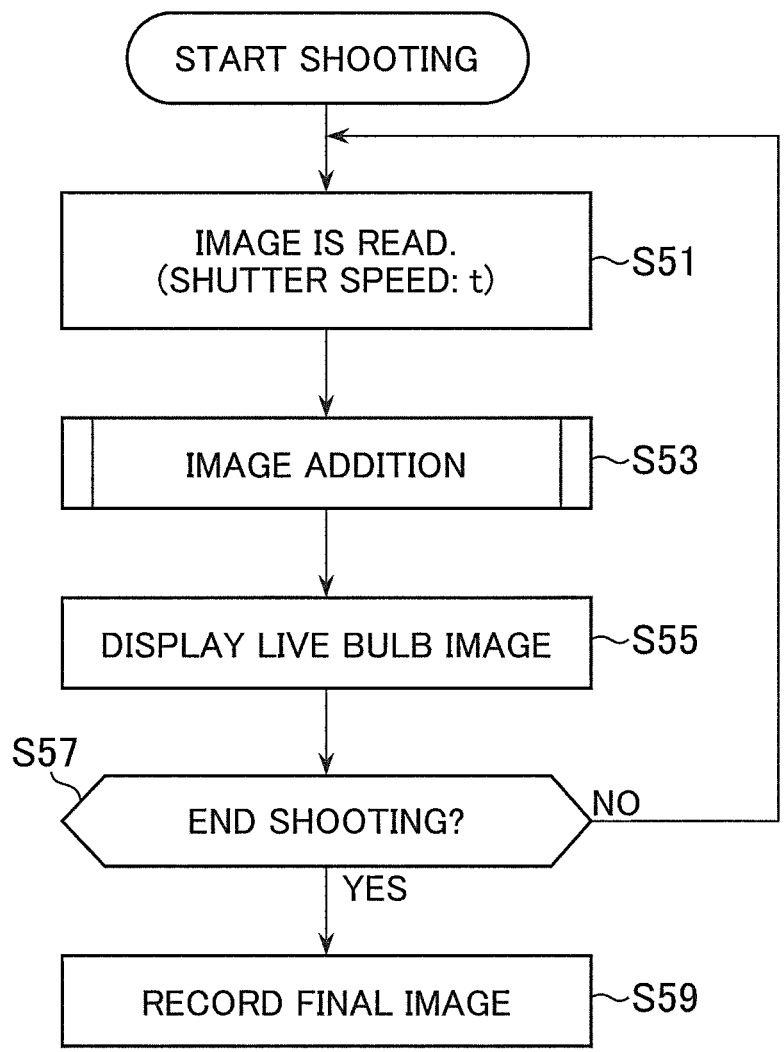
FIG. 3 is a flowchart showing operations of the camera for generating an added image in the bulb shooting mode according to the first embodiment of the invention.

Next, image processing at step S21 for generating the added image will be described using FIGS. 3 and 7. FIG. 3 is a flowchart showing the outline of operations for generating the added imaged in the Live BULB mode. Bulb shooting is started and then the image is read out (S51). Here a shutter speed is set to "t" (equivalent to the exposure increment time "T") and an image of a frame is exposed and read out. The operations at this step are equivalent to those at steps S11 to S19 in FIG. 2 descried above and so detailed descriptions are omitted.

After the image is read out, image addition is performed (S53). Here the previous added image data is added to the image data read-out each time the exposure increment time "T" elapses to generate new added image data. After that, the generated added image is processed.

After the image addition, the live bulb image is displayed (S55). Here the added image data obtained at step S53 is displayed on the display unit 22. The operation at this step is equivalent to that at step S25 in FIG. 2 described above and so detailed descriptions are omitted.

After the live bulb image is displayed, it is determined whether or not shooting is continued (S57). Here whether or not the bulb shooting is ended or is continued is determined based on whether the second release button is off. If the result of determination is that bulb shooting is not ended (step S57: No), the process returns to step S51 and bulb shooting is continued. The operation at this step is equivalent to that at step S27 in FIG. 2 described above and so detailed descriptions are omitted.

If the result of determination in step S57 is that bulb shooting is ended (step S57: Yes), the final image is recorded (S59). Here the added image data generated at step S53 is recorded in the external memory 21. The operation at this step is equivalent to that at step S29 in FIG. 2 described above and so detailed descriptions are omitted.

Figure 4:
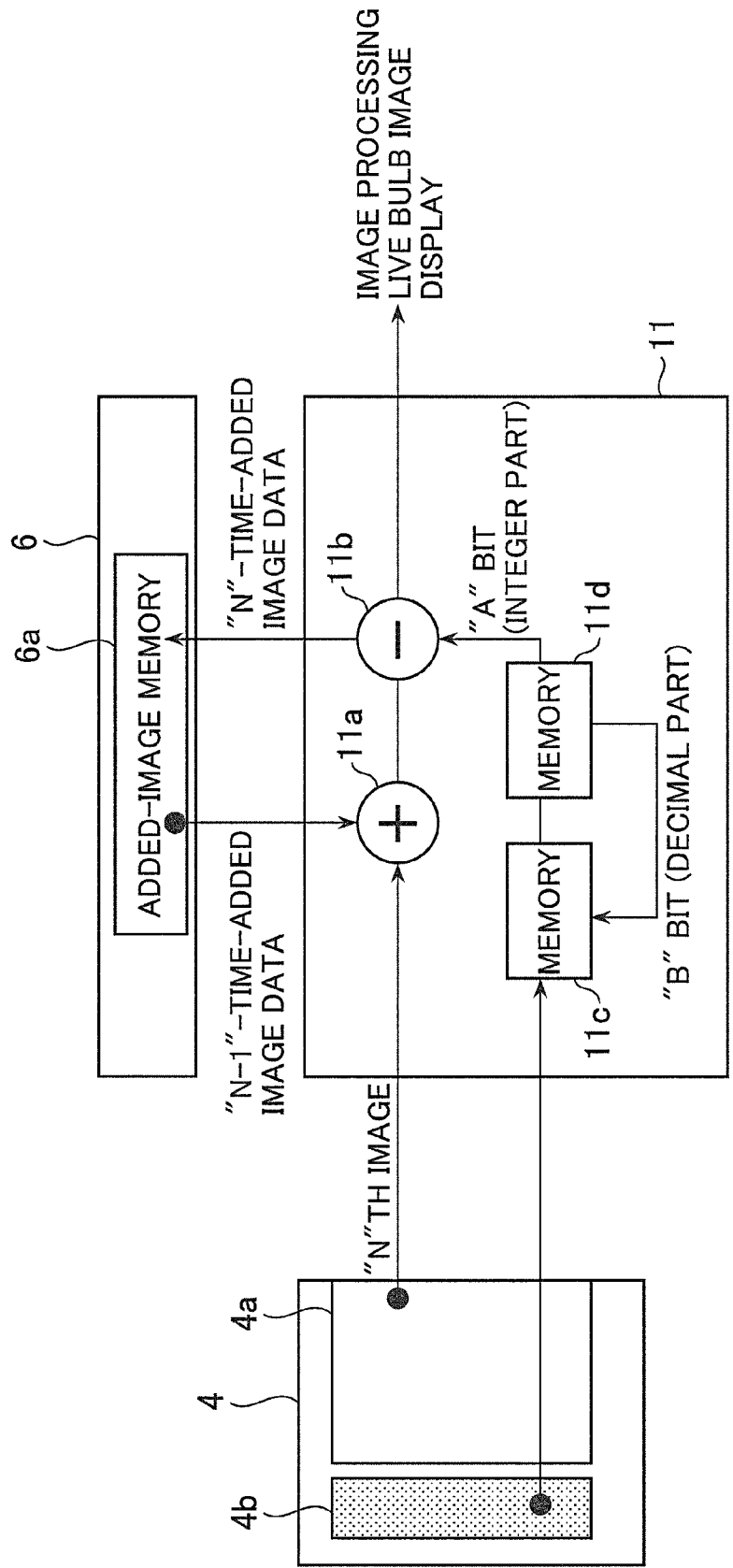
FIG. 4 is a block diagram of elements for performing OB compensation and added-image processing in the camera according to the first embodiment of the invention.

Next, image processing for generating the added image will be described using FIG. 4. As described above, the image sensor 4 consists of an effective pixel region 4a which photoelectrically converts the object image and outputs image data and an OB pixel region 4b where light is completely shielded and outputs the OB output level.

The image synthesizing unit 11 includes an adder 11a, a subtractor 11b, a memory 11c, and a memory 11d. The adder 11a adds the image data from the effective pixel region 4a and the added image data from an added image memory 6a together. Here the image data obtained from the effective pixel region 4a is "A"-bit digitized data and the image data read from the added image memory 6a is also "A" bit. The subtractor 11b subtracts a value of integer part of the average value of OB output levels output from the memory 11d ("A" bit) from the added image output from the adder 11a. (Hereinafter the value of integer part of the average value of OB output levels to be subtracted from the added image is referred to as "OB subtraction part").

The average value of OB output levels based on the output of the OB pixel region 4b is stored in the memory 11c in the image synthesizing unit 11. The average value of OB output levels is an average value of digital data of a plurality of the OB output levels output from the OB pixel region 4b. The number of bits after a decimal point stored in the memory 11c is equal to or larger than a log at a bottom which is a maximum number "N" of the added images. Specifically, a relation of the following formula (1) is satisfied:

$$\text{The number of bits after a decimal point} \geq \text{Log}_2(N) \quad (1)$$

Here the maximum number of the added images "N" is an upper limit value set in advance in case of the Live BULB mode. The upper limit value of pieces of the addition is set in advance since image deterioration occurs due to noise, for example, by repeating the addition. Therefore, according to the embodiment, when the number of the addition operations exceeds the maximum number of addition even in case of the Live BULB mode, the addition operation is not performed and the added image data is not updated.

The memory 11d outputs an integer part "A" bit and a decimal part "B" bit of the digital data of the average value of OB output levels stored in the memory 11c, to the subtractor 11b and to the memory 11c, respectively. After the "B" bit, which is after the decimal point is input, the memory 11c adds the "B" bit to the average value of OB output levels output from the OB effective pixel region 4b. As described, the memory 11c has an adding function as well as a memory function.

The internal memory 6 has an added-image memory 6a. "N"-time-added image data where "N" pieces of the image output from the subtractor 11b have been added together is input into and temporarily stored in the added image memory 6a. After the image data is output from the effective pixel region 4a in the image sensor 4, the internal memory 6 outputs the "N"-time-added image data temporarily stored in the added image memory 6a. Thus if the image data is output from the effective pixel region 4a in the image sensor 4, a latest added image data is stored in the added image memory 6a.

Figure 5:
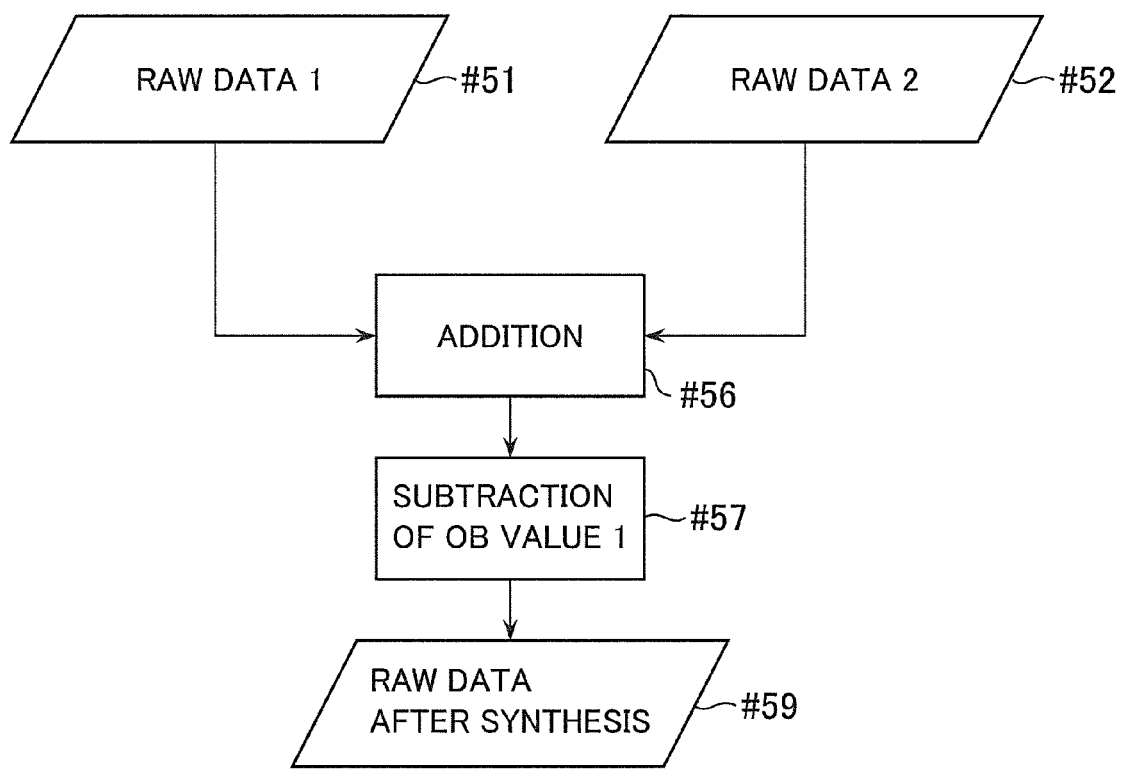
FIG. 5 is a diagram showing a procedure for synthesizing RAW image data in the camera according to the first embodiment of the invention.

Operations for OB compensation and added-image processing shown in the block diagram of FIG. 4 will be described using FIG. 5. In FIG. 5, RAW image data 1 (#51) corresponds to the image data output from the effective pixel region 4a in the image sensor 4 (RAW format data) and RAW image data 2 (#52) corresponds to "N−1"-time-added image data output from the added image memory 6a in the internal memory 6 (RAW format data). Addition of #56 corresponds to addition by the adder 11a in the image synthesizing unit 11 and subtraction of an OB value 1 of #57 corresponds to subtraction by the subtractor 11b in the image synthesizing unit 11.

The RAW image data 1 from the image sensor 4 (#51) and the RAW image data 2 from the internal memory 6 (#52) are added together (#56). After this addition, the OB value 1 is subtracted from the addition value (#57) and then this result is output as RAW image data after synthesis (#59).

A correspondence relationship in configuration between FIG. 4 and FIG. 5 will be described below. First of all, the image data (RAW image data 1) is output from the image sensor 4, which corresponds to an $N^{th}$ image input into the adder 11a of FIG. 4. Next, the latest added image data (RAW image data 2) is output form the internal memory 6, which is corresponds to an "N−1"-time-added image data input into the adder 11a of FIG. 4. Both image data are added together (addition of the adder 11a in FIG. 4), and then the added image is generated. The OB value 1 has been included in the RAW image data 1 which corresponds to the $N^{th}$ image data, as described using FIGS. 20A-C. Therefore the OB value 1 is also included in the individual RGB pixel output in the added image. That's why the OB value 1 is subtracted from the added image data (#57). The RAW image data after synthesis is obtained by subtracting the OB value 1 (#59).

Figure 6:
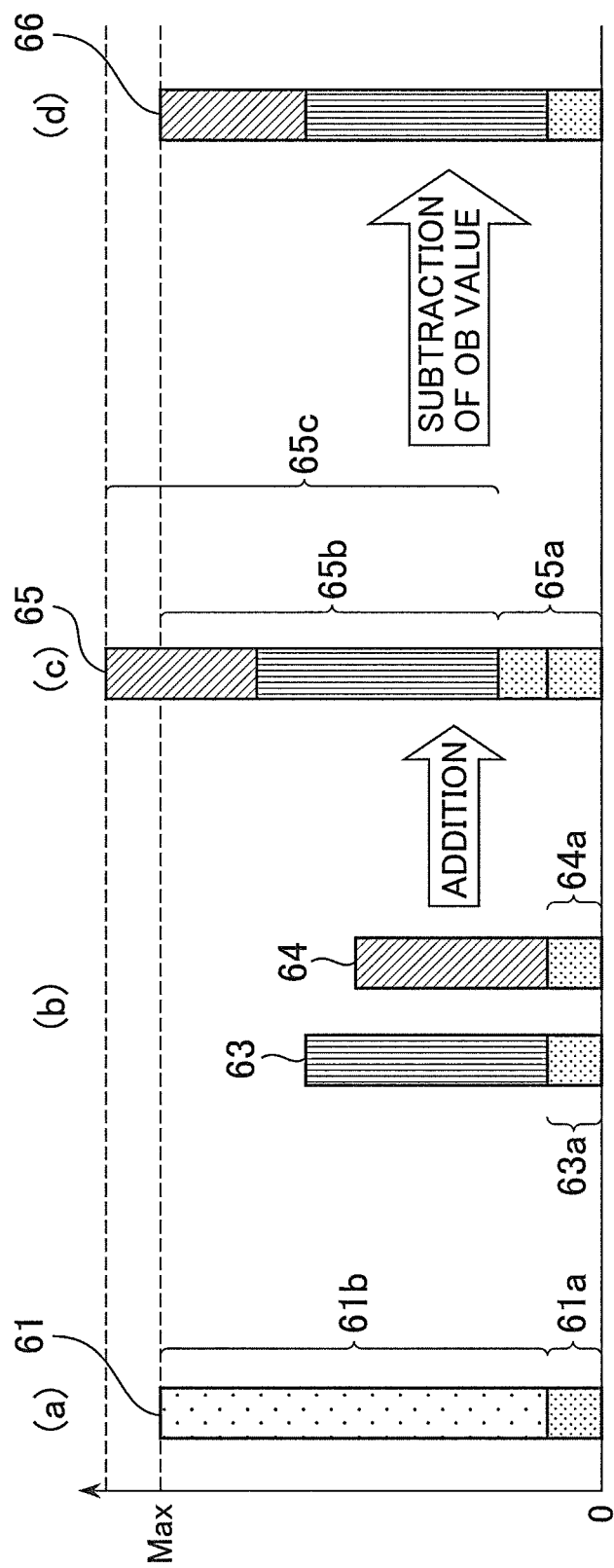
FIG. 6 is a diagram showing a relationship between pixel data in an effective pixel region and an average value of OB pixel levels when RAW image data is synthesized in the camera according to the first embodiment of the invention.

It is preferable to set a flexible value relative to a maximum value of the RAW image data for subtraction of the OB value 1, corresponding to the average OB output level output from the OB pixel region 4b, of #57. A description about this point will be given using FIG. 6. In FIG. 6, (a) shows the maximum value of the RAW image data output from the effective pixel region 4a in the image sensor 4. Here a reference numeral 61a and a reference numeral 61b correspond to the OB value of the effective pixel region and the value of actual image data, respectively.

In FIG. 6 (b), image data 63 corresponds to the added image (the RAW image data 1 of FIG. 5) and image data 64 corresponds to the image data which has just read from the image sensor 4 (the RAW image data 2 of FIG. 5). The image data 63 and 64 include OB values 64a and 64b of the effective pixels, respectively. So image data 65 obtained by adding the image data 63 and the image data 64 together may exceed the maximum value of the RAW image data as shown in FIG. 6 (c). Specifically, the value of an OB value 65a of the effective pixel region is doubled by addition operation, and so an addition value becomes smaller than as it is if the addition value is topped out at the maximum value of the RAW image data (Refer to a reference numeral 65b). Hence, it is preferable that a margin around a bit is given to the number of bits of the memory for storing the image data and the number of bits for a bus line, for example, so that a value which exceeds the maximum value of the RAW image data by an OB value can be responded to (Refer to a reference numeral 65c). This avoids overflow toward the maximum value of added RAW image data (for example when the number of bits of the RAW image data is 12 bits digitalized data).

With the margin for the number of bits of the memory when addition is performed, the addition value is properly calculated. The image data 66 is smaller than or equal to the maximum value of the RAW image data as shown in FIG. 6 (d) if the average value of the OB pixel levels is subtracted from the addition value (Refer to #57 of FIG. 5). As described above, addition and OB compensation are properly performed for an object such as a flower and the moon whose luminance is high and RAW image data is the maximum value by setting the number of bits where the OB levels for two frames are considered as the number of bits of the image memory in order to generate the synthesized image data, as described above.

Figure 7:
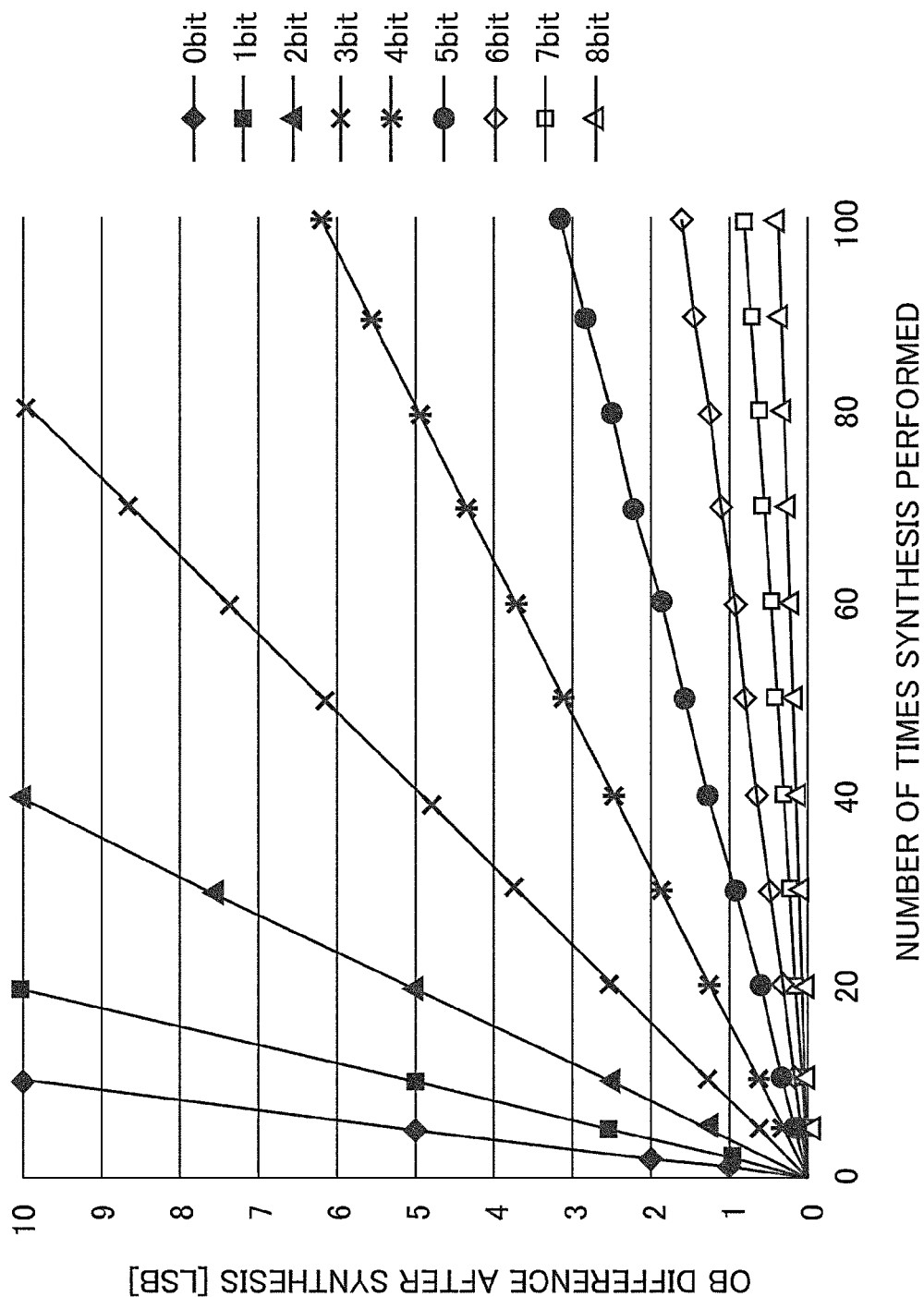
FIG. 7 is a graph showing a relationship between the number of digits after a decimal point and an OB difference after addition processing in the camera according to the first embodiment of the invention

FIG. 7 shows a relationship between the number of bits after a decimal point and an OB difference after synthesis processing. In FIG. 7, a horizontal axis and the vertical axis indicate the number of times of performing synthesis for generating an added image data and an OB level difference after synthesis processing, respectively. Trends are plotted in cases that the decimal part is 0 (zero) to 8 (eight) bits. When the number of bits of the effective pixels (the number of bits of the integer part) is 12 bits, color differences are noticeable to humans in case of that the OB difference is larger than 5 (five) LSB (least significant bit) and color differences cannot be easily noticed by humans in case of that the OB difference is smaller than 1 (one) LSB. For example, when the maximum number of added images "N" is set at 100, the number of bits after the decimal point should be 7 (seven) bits so that color differences cannot be surely recognized. Additionally, in case of some special image processing, a gain of several times to several 10s of times is applied and so even a slight error of 1 (one) or 2 (two) LSB is enhanced, which causes color differences. Therefore, it is preferable to increase the number of bits after the decimal point when a special processing is performed.

As described above, according to the first example embodiment of the invention, when OB compensation is performed by subtracting the average of the OB pixel output levels from the added image data. Although the added image data includes only the integer part of digitalized data, the average of OB pixel output levels includes both the integer part and the decimal part. Hence, OB compensation is performed by (1) subtracting the data of the integer part (OB subtraction part) (Recall that the "A"-bit-integer part is output from the memory 11d to the subtractor 11b) and (2) adding the data after the decimal point of the average of OB pixel output levels to the average of OB pixel output levels (Recall that the "B"-bit decimal part is output from the memory 11d to the memory 11c and then added to the average of OB pixel output levels). As a result, a slight OB compensation value after the decimal point is saved and used for the next OB compensation (also referred to as "carried"). In this way, slight (decimal part) OB compensation differences are not accumulated and ignored, and color differences described in FIGS. 20B and 20C can be prevented.

Second Embodiment

Next, a second example embodiment consistent with the present invention will be described using FIGS. 8-11. According to the first example embodiment, color differences are prevented by saving information in bits after the decimal point of the average of OB pixel output levels by the image processing unit when the added image is generated. According to the second example embodiment, calculation of bits after the decimal point of the average value of OB pixel output levels according to the first example embodiment is performed as image processing calculation for generating the added image. Further a difference between the effective output level when light is shielded and the average of OB pixel output levels of the OB pixel region is calculated (hereinafter referred as to "OB level difference"). Then an added-image output level is compensated based on the OB level difference. According to the compensation, color differences caused by a difference of levels between the effective output level when light is shielded and the OB output level of the OB pixel region are also prevented when OB compensation is performed.

Generally, even when light is not incident (that is, when light is physically shielded), the RGB output levels of the effective pixel in the image sensor include offset noise which the image sensor has in each effective pixel. Therefore it is beneficial to remove the offset noise even when an object image of white light is incident into the image sensor; otherwise the offset noise might cause color imbalance and color differences in the image data. A level of the above-described offset is obtained by exposing the image sensor in a state where the image sensor is physically light-shielded. However, it takes time a while to obtain the offset level of the image data from the image sensor in the above-described light-shielded state since it is necessary to read the image data from the image sensor. Additionally, a release time lag is increased if the offset level is obtained. To avoid problems caused by such delays, the average value of OB output levels is generally used as the offset level.

Unfortunately, however, the offset level of the OB output level in the image sensor sometimes does not correspond with that of the effective pixel region (which is used for shooting the object) since the OB pixels and the pixels of the effective pixel region are different from each other, and are arranged at different places in the image sensor. There are differences in the offset levels between the OB pixels and the pixels of the effective pixel region. If offset level compensation is performed using only the data from the OB pixels, color differences might occur in the image data. This phenomenon is generally called an OB level difference. The second example embodiment prevents the color differences in the image data caused by the OB level difference.

Figure 10:
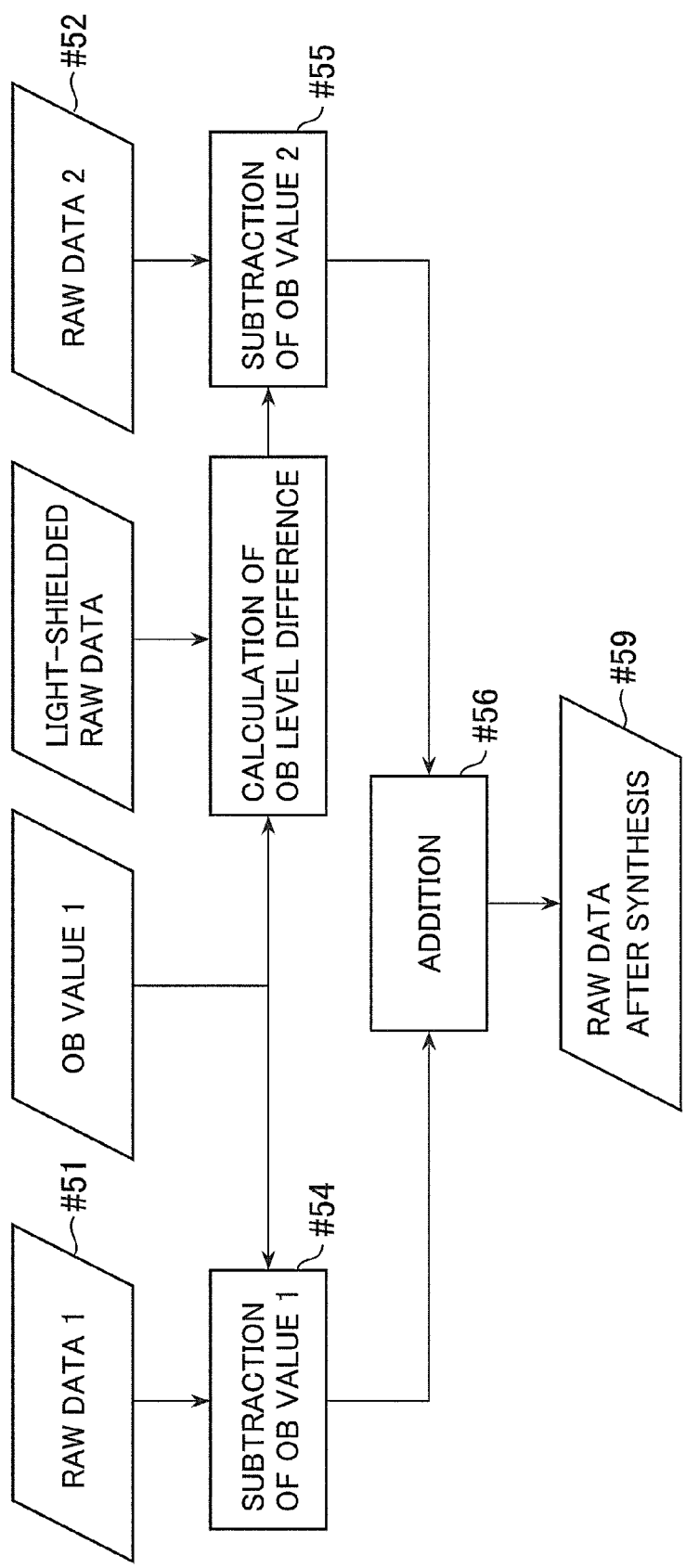
FIG. 10 is a diagram showing a procedure for synthesizing RAW image data in the camera according to the second embodiment of the invention.

A structure of the embodiment is as same as that shown in the schematic block diagram of FIG. 1 according to the first embodiment. Operations of bulb shooting according to the second example embodiment are shown in a flowchart of FIG. 8, which replaces the flowchart of FIG. 3 of the first example embodiment. Similarly, synthesis processing of RAW image data according to the second example embodiment is shown in FIG. 10, which replaces FIG. 5 of the first example embodiment. Further operation steps of bulb shooting according to the second example embodiment are performed in the same manner as FIG. 2 according to the first example embodiment.

Figure 9:
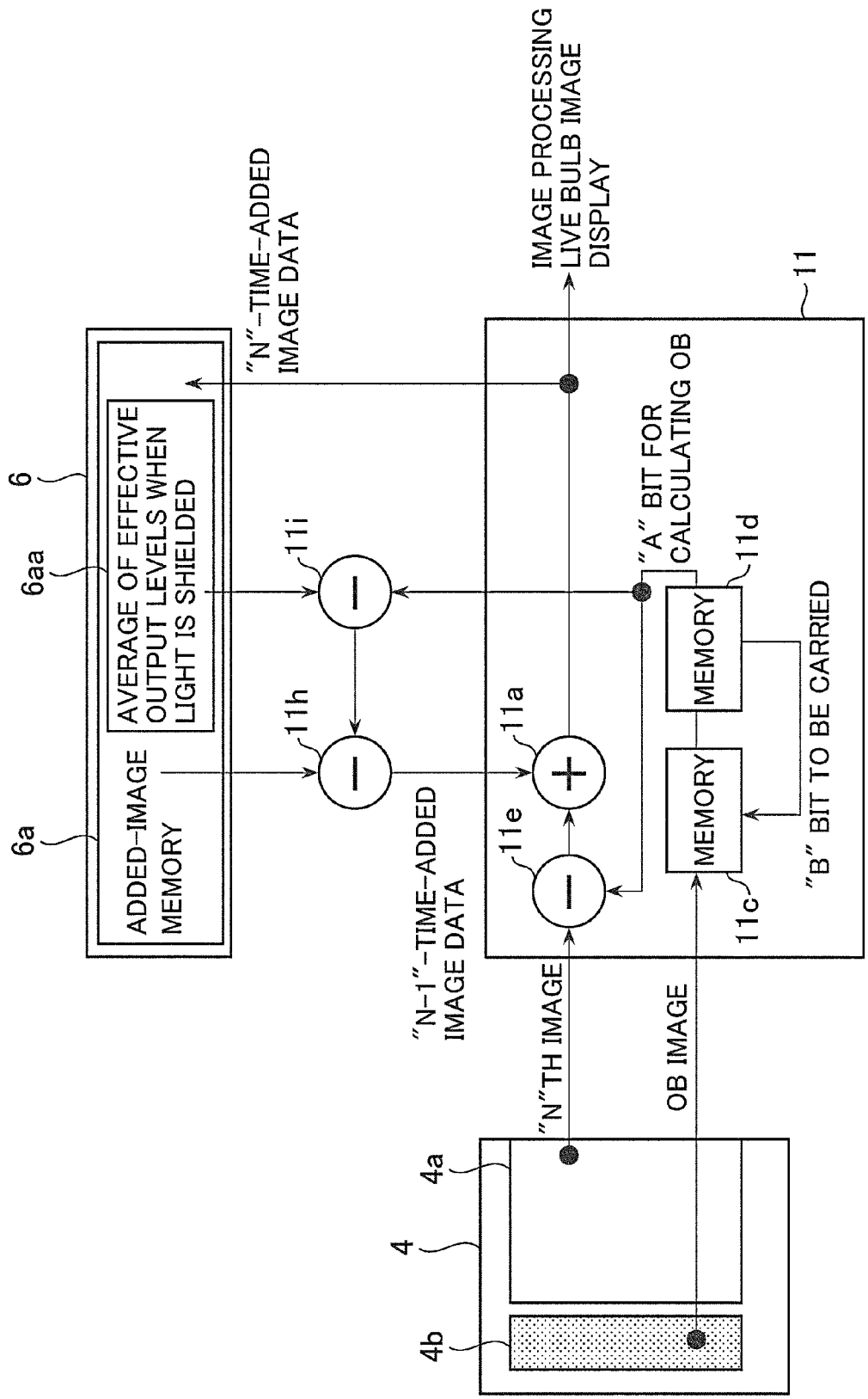
FIG. 9 is a block diagram of elements for performing OB compensation and added-image processing in the camera according to the second embodiment of the invention.

FIG. 9 is a block diagram showing added-image processing according to the second example embodiment. According to the first example embodiment, as shown in the block diagram of FIG. 4, addition operation is performed by the adder 11a and then the average value of OB output levels is subtracted by the subtractor 11b for added-image processing. On the other hand, according to the second example embodiment, a first subtractor is disposed between an adder 11a and an effective pixel region 4a as shown in the block diagram of the FIG. 9. In this way, the average value of OB output levels can be subtracted before the addition operation. Further, a second subtractor is disposed between the adder 11a and an added image memory 6a.

Bulb shooting operations will be described using the flow-chart of FIG. 8. First of all, shooting is started and light-shielded image data is read (S61). At step S61, charge accumulation of the image sensor 4 is performed while the mechanical shutter 3 of the image pickup apparatus is closed, in other words, in a state where the image sensor is physically light-shielded. Next, after time corresponding to a shutter speed "t" has elapsed since starting charge accumulation of the image sensor 4, light-shielded image data corresponding to the effective pixel region and the OB pixel region are read from the pixel of the effective pixel region 4a and the OB pixel region 4b of the image sensor 4 (Refer to FIG. 4), respectively.

After the light-shielded image data corresponding to the effective pixel region and the OB pixel region are read at step S61, the OB level difference is calculated based on each light-shielded image data which corresponds to the effective pixel region and the OB pixel region, respectively (S63). Specifically, at the step S63, the OB level difference is determined based on a difference between the average value of the light-shielded image data from the effective pixel region 4a read at step S61, and the average value of OB output levels of the OB pixel region.

After the OB level difference is calculated at step S63, the mechanical shutter 3 is released so that the object image is incident into the image sensor 4. After that, exposure operation of the image sensor 4 is performed during the shutter speed "t" and image data is read from the image sensor 4 (S65). At step S65, as with the operation of step S51 described in the first example embodiment (Refer to FIG. 3), exposure operation for a frame is performed with respect to the image sensor 4 with setting an electronic shutter speed based on electrically giving control signals for controlling start and end of exposure as "t" corresponding to the exposure increment time "T" for a frame and then the image data is read after exposure is completed.

After the image data is read, image addition is performed (S67). At step S67, the added image data temporarily stored in the internal memory 6 is added to the image data read from the effective pixel region 4a in the image sensor 4. According to the first example embodiment, OB compensation is performed after the addition operation. (Recall, e.g., FIGS. 4 and 5.) However, according to the second example embodiment, the average value of OB output levels is subtracted from each RAW image data before the addition operation. More details about OB compensation will be described later using FIG. 10.

After image addition is performed at step S67, the OB level difference is subtracted from the added image data (S69). At step S69, the OB level difference calculated at step S63 is subtracted from the added image data calculated at step S67. More details about the offset compensation will be described later using FIG. 10, too.

After the OB level difference is subtracted from the added image data at step S69, a live bulb image is displayed (S71).

At step S71, as same as step S55 according to the first example embodiment with reference to FIG. 3, the added-image generated at step S69 is displayed on the display unit 22.

After the live bulb image is displayed at step S71, it is determined whether or not shooting is continued (S73). The operation of step S73 is as same as that of step S57 described in the first example embodiment with reference to FIG. 3. Specifically, whether the user ends or continues bulb shooting is determined based on whether or not the second release switch is off. If the result of determination in step S73 is that shooting is not ended (step S73: No), the process returns to step S65 and then bulb shooting is continued.

If, on the other hand, the result of determination in step S73 is that shooting is ended (step S73: Yes), a final image data based on the added image is recorded (S75). At step S75, the added image data generated at steps S67 and S69 is stored in the external memory 21.

FIG. 9 is the block diagram explaining image processing for performing OB compensation and added-image processing according to the second example embodiment. Although the structure and schematic of FIG. 9 are similar to those of FIG. 4 according to the first example embodiment, the second example embodiment differs from the first example embodiment in the following respects:

(i) in FIG. 9, the subtractor 11e is arranged between output of the image sensor 4 and the adder 11a;
(ii) in FIG. 9, the subtractor 11h is disposed between the added-image memory 6a and the adder 11a; and
(iii) in FIG. 9, the average value of effective output levels in a light-shielded state 6aa is stored in the added-image memory 6a and the subtractor 11i is disposed between the added-image memory 6a and the memory 11d, which is also connected to the subtractor 11e.

Next, added-image processing, OB compensation and offset compensation will be described using FIG. 10. In FIG. 10, RAW image data 1 (#51) corresponds to the image data output from the effective pixel region 4a in the image sensor 4 (RAW format data) and RAW image data 2 (#52) corresponds to added image data output from the added image memory 6a in the internal memory 6 (RAW format data), as was the case in FIG. 5 according to the first example embodiment.

First of all, an OB value 1 is subtracted from the RAW image data 1 (#54). (See, e.g., element 11e of FIG. 9.) Here bits after the decimal point of the average value of OB output levels recorded in the memory 11c (See FIG. 9) are saved and used in the next OB compensation, as was the case in the first example embodiment, so that color differences caused by an accumulation of slight errors of the average values of OB output levels can be prevented.

Additionally, an OB value 2, corresponding to an OB level difference (See, e.g., the output of element 11i of FIG. 9), is subtracted from the RAW image data 2 (#55) based on the added image data output from the added image memory 6a. (See, e.g., element 11h of FIG. 9.) For a second and subsequent synthesis of added image data, RAW image data after synthesis (#59) is regarded as the RAW image data 2. (See, e.g., the output of adder 11a fed back to the added memory storage 6a of FIG. 9.)

After subtraction of the OB value 1 (#54) from the RAW image data 1 (#51) and subtraction of the OB value 2 (#55) from the RAW image data 2 (#52), results of these subtractions (#54 and #55) are added together (#56). (See, e.g., the outputs of subtractors 11e and 11h provided as input to adder 11a in FIG. 9.) Specifically, the addition operation is performed by the adder 11a in the image synthesizing unit 11.

Image data after offset (OB) addition shall be RAW image data after synthesis (#59).

Figure 11:
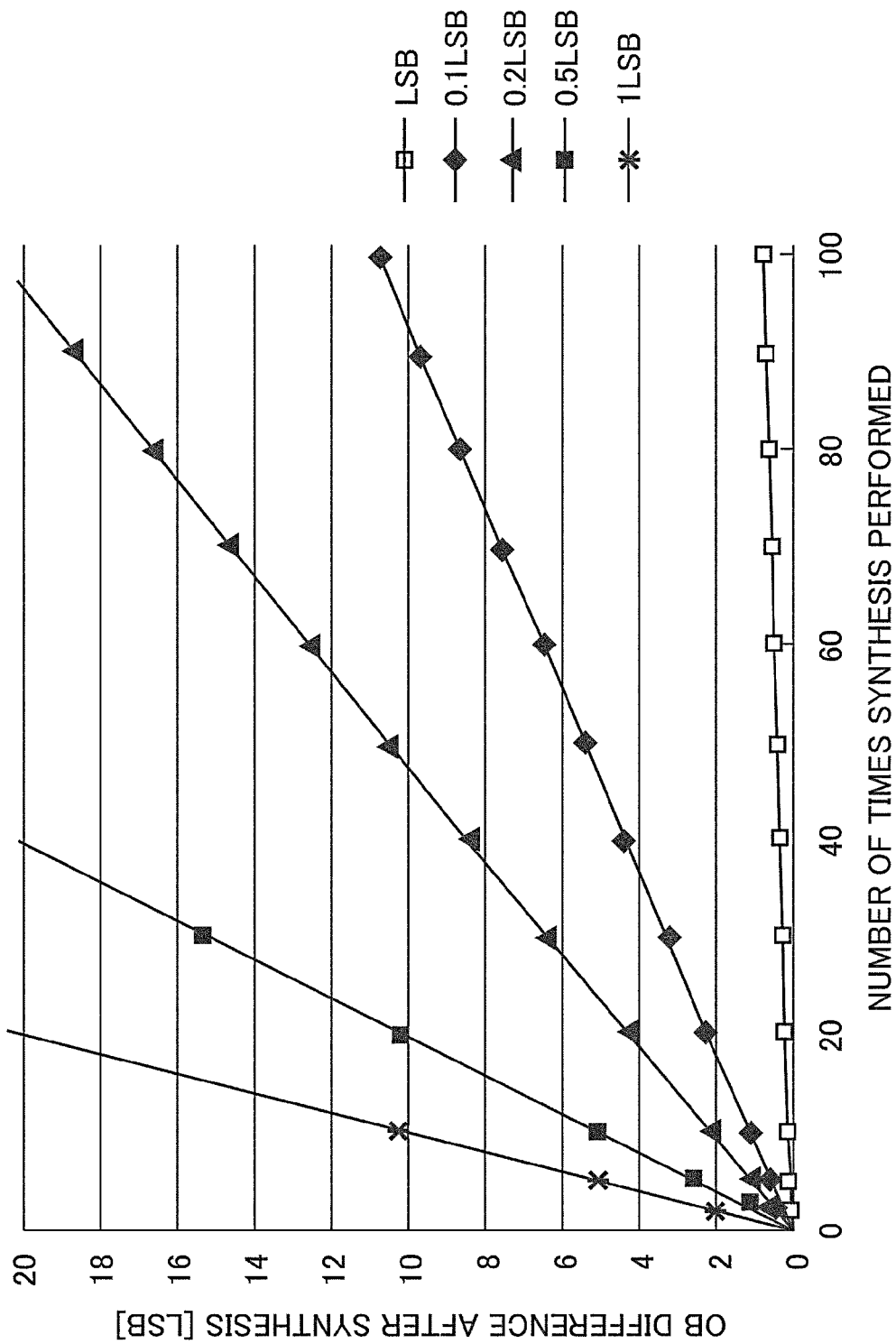
FIG. 11 is a diagram showing a relationship between a least significant bit level (LSB) of an offset level of the average value of OB output levels and an OB level difference after addition processing in the camera according to the second embodiment of the invention.

FIG. 11 shows an example of a relationship between the OB level difference and the OB difference of image data after synthesis processing according to the second example embodiment. In FIG. 11, a horizontal axis and the vertical axis indicate the number of pieces of synthesis for generating an added image data and an OB difference after synthesis processing, respectively. (A unit of the vertical axis is a value which corresponds to the number of bits of the least resolution when image data is quantized (LSB: least significant bit).) In FIG. 11, the relation between the OB level difference and the OB difference after synthesis processing with respect to the number of pieces of synthesis is plotted in case that the OB level difference is 0 (zero) to 1 (one) LSB. As an example, FIG. 11 shows a result in case that the number of bits after the decimal point is 7 (seven) bits. As previously described, color differences are typically not noticed by humans when an OB difference is equal to or smaller than 5 (five) LSBs. Accordingly, an upper limit of the number of pieces of addition may de decided depending on the OB level difference included in a piece of image data for live bulb image display in bulb shooting.

It is known that traditionally the OB level difference is improved by FPN (fixed pattern noise) compensation, which is a noise compensation of the image sensor. However, the second example embodiment of the invention is suitable for OB difference compensation for the following reasons:
(i) OB differences of the live bulb image data can be optimally compensated; and
(ii) even when dark current, which causes the OB level difference, is not proportional to exposure time or when ambient temperature of an image sensor changes during shooting and FPN also changes along with change in ambient temperature, OB differences can still be compensated.

As described above, the operations according to the second example embodiment are as follows. First, the OB level difference, in other words, the difference between the average value of effective output levels and the average of OB output levels, is calculated from the light-shielded image data (S63 of FIG. 8). After that, OB offset compensation is performed using this OB level difference (S69 of FIG. 8 and #55 of FIG. 10). Briefly, according to the second example embodiment, exposure is performed in a light-shielded state when bulb shooting is performed (S61 of FIG. 8). After the exposure operation is performed, the difference between the image data read from the effective pixel region and the average of OB output levels read from the OB pixel region is calculated (S63 of FIG. 8). Next, compensation of the added image data generated by the image synthesizing unit 11 is performed using the difference (S69 of FIG. 8, #55 of FIG. 10). Accordingly color differences caused by variety of offset levels of the effective output levels and the OB output levels.

Third Embodiment

Figure 12:
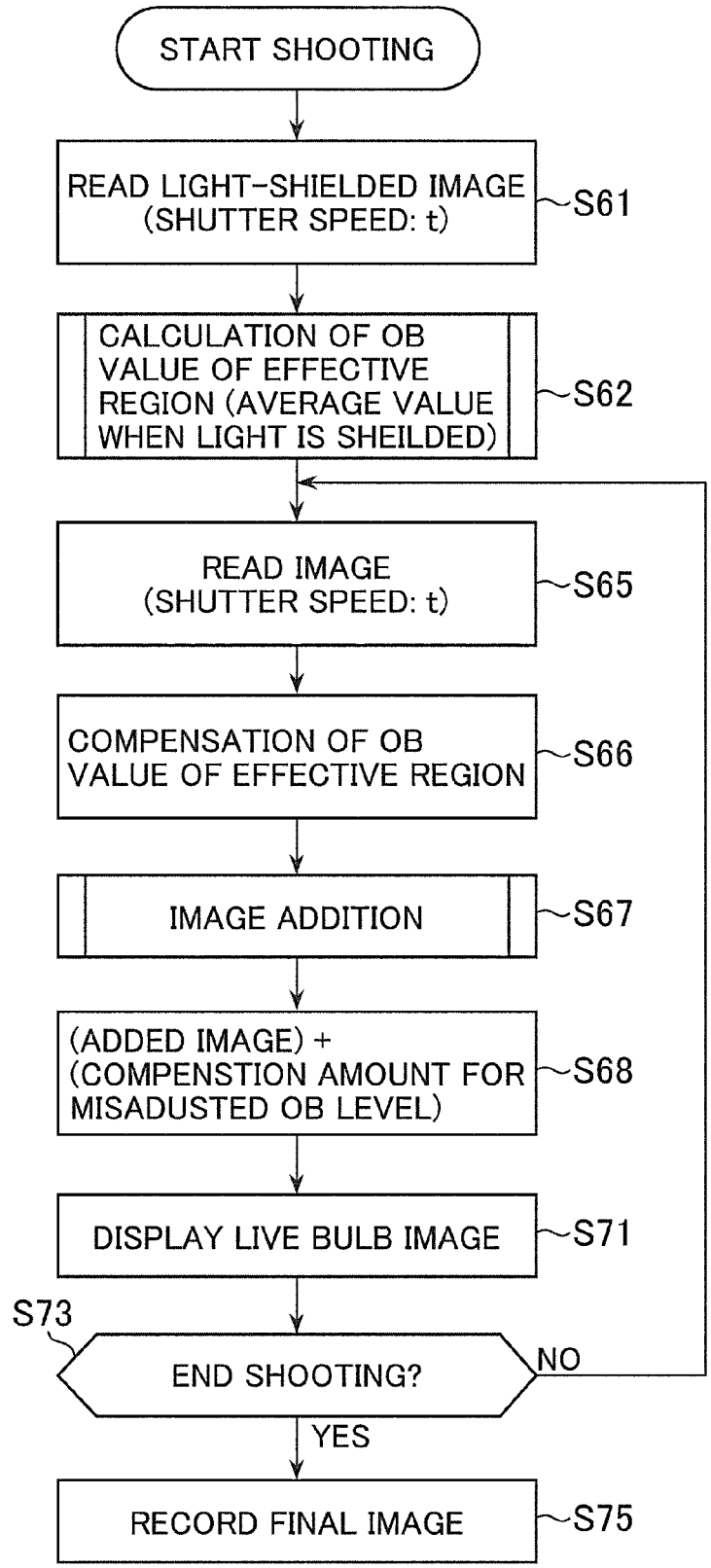
FIG. 12 is a flowchart showing operations of the camera for generating an added image in the bulb shooting mode according to a third embodiment of the invention.
Figure 13:
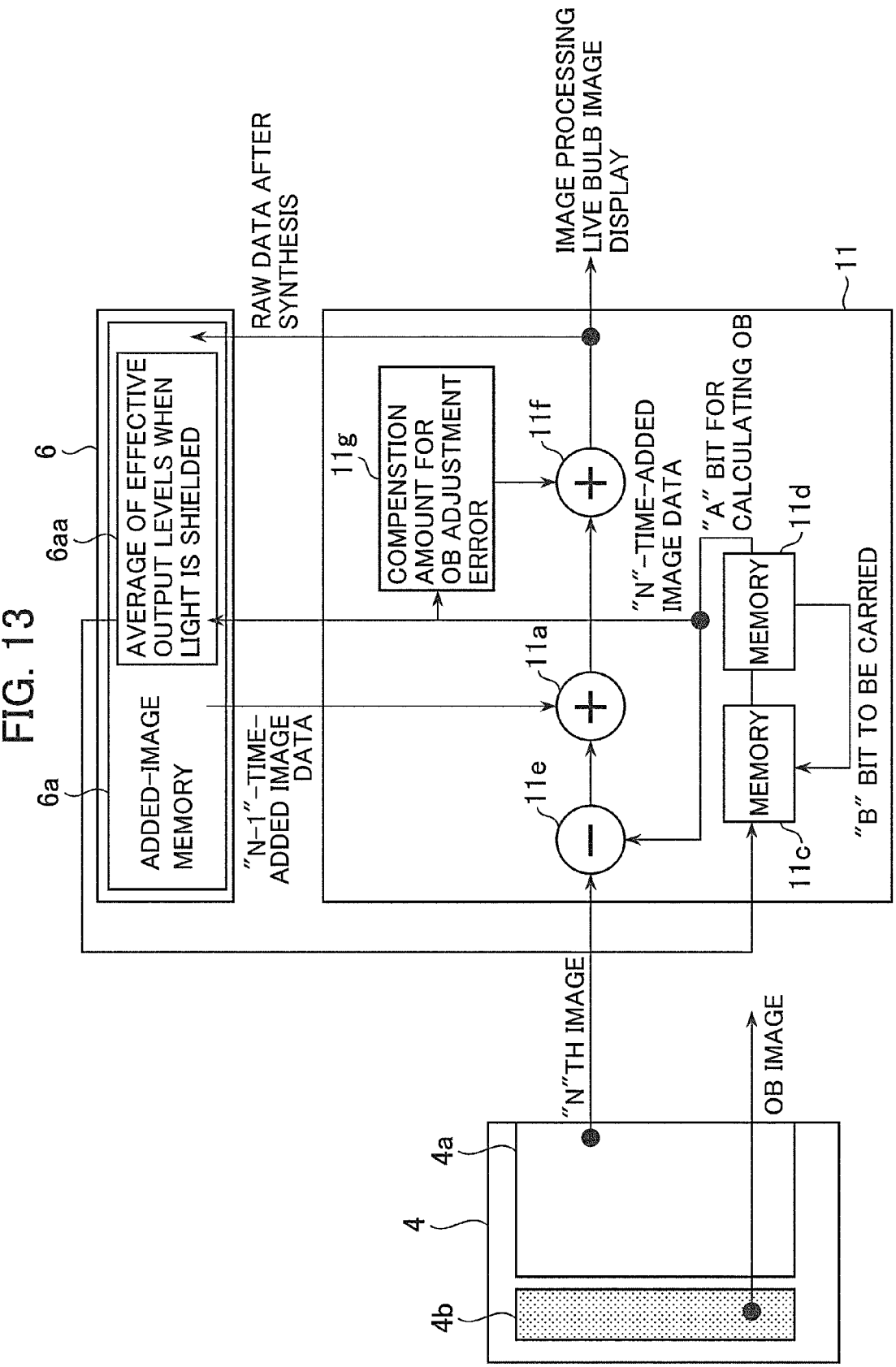
FIG. 13 is a block diagram of elements for performing OB compensation and added-image processing in the camera according to the third embodiment of the invention.
Figure 14:
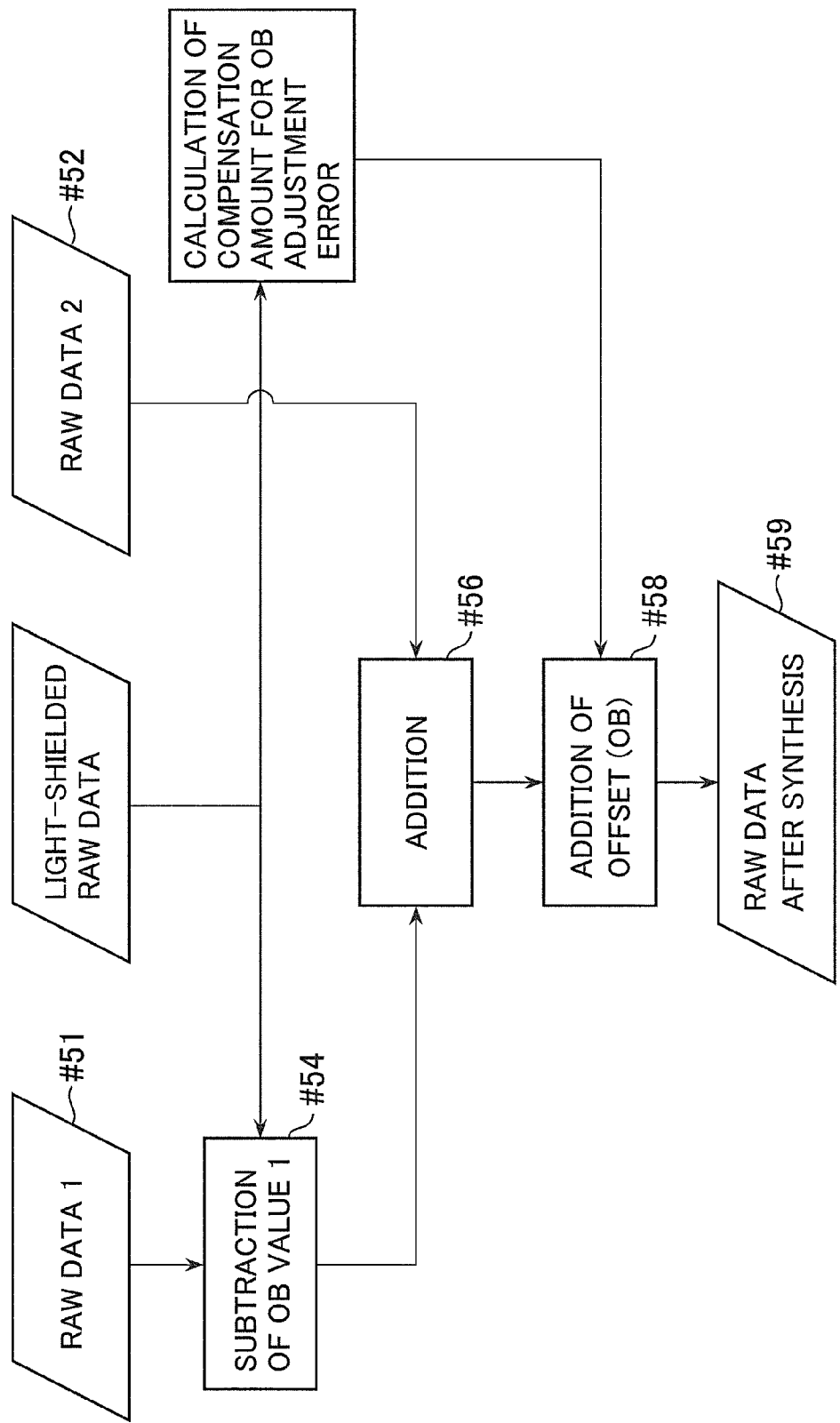
FIG. 14 is a diagram showing a procedure for synthesizing RAW image data in the camera according to the third embodiment of the invention.

Next, a third example embodiment consistent with the present invention will be described using FIGS. 12-15C. FIG. 12 is a flowchart of a shooting operation corresponding to FIG. 8. FIG. 13 is a calculation block diagram of an addition pixel. FIG. 14 shows operation of a flowchart of image synthesis.

According to the first and second example embodiments, the average of OB pixel output levels is subtracted from the image data which is obtained by the $N^{th}$ exposure and corresponds to the RAW image data 1 as the OB value 1. On the other hand, according to the third example embodiment, the OB value 1 is compensated based on the average value of effective output levels when light is shielded, instead of the average of OB pixel output levels. Hereinafter the compensation of the OB value 1 is referred to as "noise reduction (NR) processing". Further, the number of pixels of the effective region in the imaging device (image sensor 4) is generally larger than that in the OB pixel region and the pixels are more largely disposed in the effective region than in the OB pixel region. Therefore the OB value, which is the output level when light is shielded, is based on the pixels in the effective image-capturing region. As a result, the OB value varies. Accordingly, a value is set as the OB compensation value considering variation of the effective pixels as well as the average value of effective output levels when light is shielded. The OB value 1 is compensated in accordance with the number of addition operations.

Bulb shooting operation will be described below using FIG. 12. First, shooting is started and light-shielded image data is read from the image sensor 4 (S61). Here a charge is accumulated in the image sensor 4 in a state where the mechanical shutter 3 remains closed, in other words, the image sensor 4 is physically light-shielded. Next, after the time corresponding to the shutter speed "t" has elapsed, the light-shielded image data is read from the effective pixel region 4a (Refer to FIG. 4).

After the light-shielded image data is read, the OB value of the effective pixel region is calculated (S62). At step S62, the average value of the light-shielded image data of the effective pixel region 4a read out at step S61 is calculated.

After the average OB value of the effective region is calculated at step S62, the mechanical shutter is released and the object image is incident into the image sensor 4. At a next step (S65), the image sensor 4 is exposed during exposure increment time corresponding to the shutter speed "t". After the exposure increment time "t" has elapsed, the image data is read from the image sensor 4 (S65). At step S65, the electronic shutter is set to "t" (equivalent to the exposure increment time "T") and exposed, and the image data is read from the image sensor 4 as was the case in step S51 described in the first example embodiment (Refer to FIG. 3). Subsequently the OB value of the effective pixel region is compensated (S66). At step S66, the average OB value of the effective pixel region calculated at step S62 is subtracted from the image data.

After the OB value of the effective pixel region is compensated, image addition is performed (S67). Then an amount of compensation for an OB adjustment error is added to the added image data (S68). At step S68, as described above, the amount of compensation for an OB adjustment error, where variation of the output of the effective pixel region when light is shielded, is set in accordance with the number of addition operations (The number of image operations may be estimated, because, at the time bulb exposure, the user may set the incremental exposure time, and see the display in an overlapped split image) and added to the added image data. According to this process, excess compensation below the black level is prevented when the OB value of the effective pixel region is subtracted at step S66. Here the added image data stored temporarily in the internal memory 6 is added to the image data read from the effective pixel region 4a in the image sensor 4. According to the first example embodiment, OB compensation is performed after addition operation. On the other hand, according to the third example embodiment, the average value of OB output levels is subtracted from each RAW image data before addition operation, as was the case with the second example embodiment. More details about this OB compensation will be described later using FIG. 14.

After the OB offset value is added to the added image data, the live bulb image is displayed (S71). Here the added image data generated at step S69 is displayed on the display unit 22 as was the case with step S55 of FIG. 3.

After the live bulb image is displayed, it is determined whether or not shooting is continued (S73). Here whether or not the bulb shooting ends or is continued is determined based on whether the second release switch is off, as was the case with the operation of step S57 of FIG. 3. If the result of determination is that shooting is not ended (step S73: No), the process returns to step S65 and then bulb shooting is continued.

If the result of determination in step S73 is that shooting is ended (step S73: Yes), a final image data is recorded (S75). Here the added image data generated at steps S67 and S69 is stored in the external memory 21.

FIG. 13 is a block diagram explaining OB compensation and added-image processing. FIG. 13 is very similar to FIG. 9 according to the second example embodiment, but differs from FIG. 9 in the following respects: a subtractor 11*h* and a subtractor 11*i* are excluded; an a adder 11*f* is arranged between an adder 11*a* and output; and an amount of compensation for an OB adjustment error 11*g* output from a memory 11*d* is output to the adder 11*f*. (See, e.g., S68 of FIG. 12, 11*g* of FIG. 13, a right block of FIG. 14).

Next, image addition, OB compensation, and offset compensation will be described using FIG. 14. In FIG. 14, as same as FIG. 5, RAW image data 1 (#51) corresponds to the image data output from the effective pixel region 4*a* in the image sensor 4 (RAW format data) and RAW image data 2 (#52) corresponds to the added image data output from the added image memory 6*a* in the internal memory 6 (RAW format data).

The OB value 1 is subtracted from the RAW image data 1 (#54). The OB value 1, which is the average value of effective output levels when light is shielded, is stored in a memory 11*c* and 11*d* (Refer to FIG. 13). Bits after the decimal point of the average OB value of effective output levels are carried in the memory 11*c* as was the case with the first example embodiment. As a result, color differences caused by a slight error of the OB value can be prevented.

For a second and subsequent synthesis of added image data, RAW image data after synthesis (#59) is regarded as the RAW image data 2 (#52). (See, e.g., the output of adder 11*f* of FIG. 13.) The OB value 1 (#54) is subtracted from the RAW image data 1 (#51) obtained by next exposure (See, e.g., the subtractor 11*e* of FIG. 13) and then the image data after the subtraction of the OB value 1 and the RAW image data 2 (#52) are added together (#56) (See, e.g., the inputs provided to adder 11*a* of FIG. 13).

After the addition is performed, offset (OB) addition is performed (#58 and step S68 of FIG. 12). Here the offset based on the OB level difference calculated at step S62 is added to the added image data calculated at #56 (step S67 of FIG. 12). (See, e.g., inputs provided to adder 11*f* of FIG. 13.) More details about the change of the OB value will be described later using FIG. 15.

The image data where offset (OB) addition has been performed is RAW image data-after synthesis (#59).

Figure 15A:
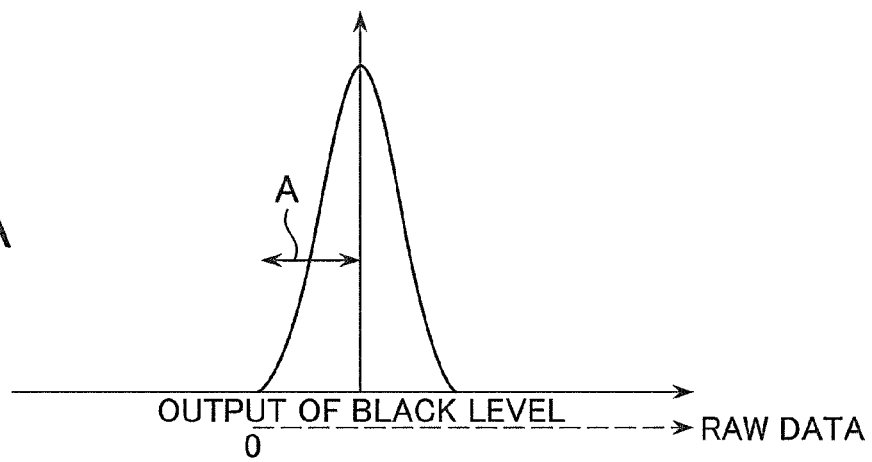
FIGS. 15A-C are diagrams explaining changing OB levels in consideration of an offset level in the camera according to the third embodiment of the invention.

Offset (OB) compensation will be described below using FIGS. 15A-C. FIG. 15A shows a noise distribution of the RAW image data when shooting is performed while the image sensor 4 is light-shielded. When light-shielded photographing is performed, noises are distributed around "black" due to characteristics of a pixel circuit of image sensor and an image sensor (Refer to FIG. 15A). Generally the RAW image data is treated as unsigned data and so "negative" noise to the left of "black" in the figure disappears when the OB value is not present. As a result, the OB of the image data is misadjusted if NR processing is performed by removing a noise component from the average value of OB output levels and the average value of effective output levels when light is shielded. Here "to be misadjusted" means that "black" is reproduced as gray-black instead of being reproduced as black.

On the other hand, when OB value is set large, the number of effective data bits (digits) in the RAW image data, which affects on tone reproduction and image quality of a saturated part. Hence, in case of the noise characteristics shown in FIG. 15A, it is preferable to have the OB value as shown by an arrow "A".

Figure 15B:
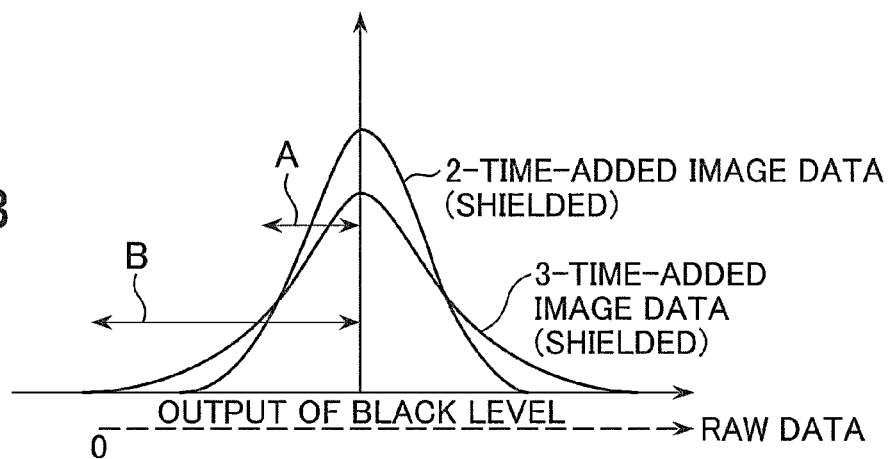

FIG. 15B shows a noise distribution when two sets of image data obtained by light-shielded photographing are synthesized. When two sets of image data obtained by different light-shielded photographing which have noise characteristics shown in FIG. 15A are added together, noise distribution becomes wider overall (Refer to FIG. 15B). When the same OB value (the arrow "A") for short exposure shown in FIG. 15A is used, a part of noise on the left is limited. Consequently, if NR processing is performed, the black level of the image data is misadjusted. Therefore the OB value of an arrow "B" is used in case of FIG. 15B.

However, if the arrow "B" is always used as the OB value, the OB value is too large for short exposure shown in FIG. 15A, and as the number of addition operations for synthesis is increased, the OB value becomes smaller. Hence according to this example embodiment, the OB value is compensated in accordance with the number of addition operations using the noise distribution of short exposure obtained by measuring the effective output levels in advance when light is shielded. The OB level difference calculated at step S63 of FIG. 12, which is corresponds to the noise distribution of short exposure, is used and, as the number of addition operations is increased, the OB value is obtained by increasing the OB level difference. At step S68 in FIG. 12 (#58 of FIG. 14), the obtained OB value is added to the added image data.

Figure 15C:
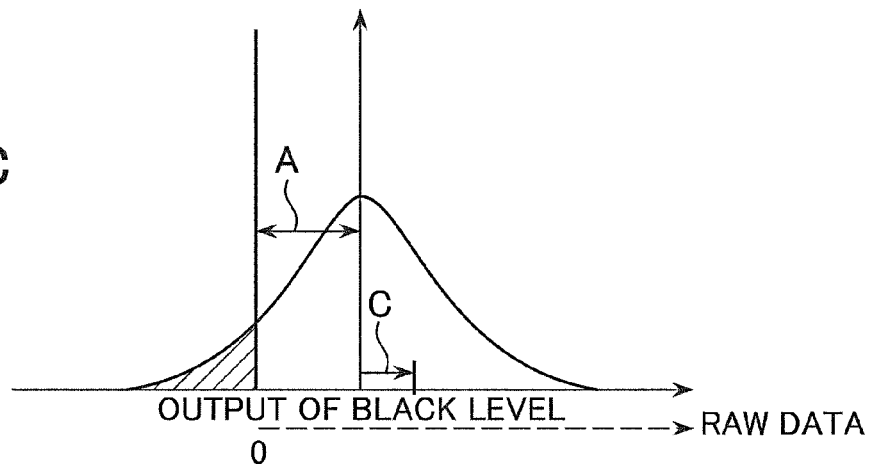

FIG. 15C is a diagram showing an outline of a phenomenon where the OB of the image data is misadjusted. As described above, the RAW image data is treated as unsigned data. A value less than 0 (zero) is rounded off to 0 when the OB value is small. Therefore a left-hand shaded area in FIG. 15 (*a*) becomes 0. With the noise distribution as shown in FIG. 15A, brightness is a center of a histogram if NR processing is performed by OB subtraction. On the other hand, when a value is 0 (zero) in the shaded area as shown in FIG. 15C, the center of the histogram is shifted to the right. In other words, the center is shifted by an amount of the arrow "C" if NR processing is performed by OB subtraction, and the OB of the image data is misadjusted as a result.

As described above, according to the third example embodiment, the OB value of light-shielded photography is compensated in accordance with the number of addition operations, and the compensated OB value is used to perform offset compensation. Therefore offset compensation is properly performed in accordance with the number of addition operations and OB adjustment error can be prevented.

Further, according to the third example embodiment, the offset (OB) value is compensated in accordance with the number of addition operations. In other words, the offset vale is calculated based on the number of pieces of synthesis of the added image data in the image synthesizing unit 11 (Refer to FIGS. 15A-C), and then the added image data generated by the image synthesizing unit 11 is compensated using the offset value (Refer to #58 of FIG. 14). As a result, OB adjustment error can be prevented.

Fourth Embodiment

Next, a fourth example embodiment consistent with the present invention will be described using FIGS. 16-18. According to the example first embodiment, color differences are prevented by storing bits after the decimal point of the average of the OB pixel output levels. According to the second example embodiment, offset compensation is performed by compensating the offset value of the OB level difference. According to the third example embodiment, OB offset compensation is performed using the average value of effective output levels when light is shielded. Further the distribution of variation of noise of effective pixel region is taken into consideration and the OB offset value where variation of noise is taken into consideration is added in accordance with the number of addition operations. According to the fourth example embodiment, in addition to these compensation operations, offset compensation is performed based on shading (in other words, variation and unevenness of the output levels in the image when light is shielded) in an image.

There is variation and unevenness in the offset levels depending on positions of individual pixels of the effective pixel region. As a result, if compensation is uniformly performed using the average value of OB output pixels, a compensation deviation occurs. A ratio of the quantized R, G, and B pixel signals is not 1:1:1, as described above with reference to FIGS. 20B and C, if a weighting operation of white balance is performed in a state where the compensation deviation occurs.

According to the fourth example embodiment, variation and unevenness of the pixel output in the image sensor 4 are detected when the OB level difference is calculated in light-shielded photographing. Next, the detected variation and unevenness are compensated (Refer to #54 and #55a of FIG. 17 (described later).) and color differences are prevented.

A structure of the fourth example embodiment is the same as that shown in the schematic block diagram of FIG. 1 according to the first example embodiment. Operations of bulb shooting are very similar to those shown in the flowchart of FIG. 8 according to the second example embodiment. However, in calculating the OB level difference at step S63 of FIG. 8, shading in the image is performed. In other words, variation and unevenness of the signals in the image when light is shielded are detected. Specifically, the pixels in the effective pixel region are divided into a plurality of regions, referred to as "blocks". After that, the difference between the average value of output levels of the blocks when light is shielded and the average value of OB output levels (in other words, the OB level difference of individual blocks), is calculated (Refer to S64 and S70 of FIG. 16).

Figure 18A:
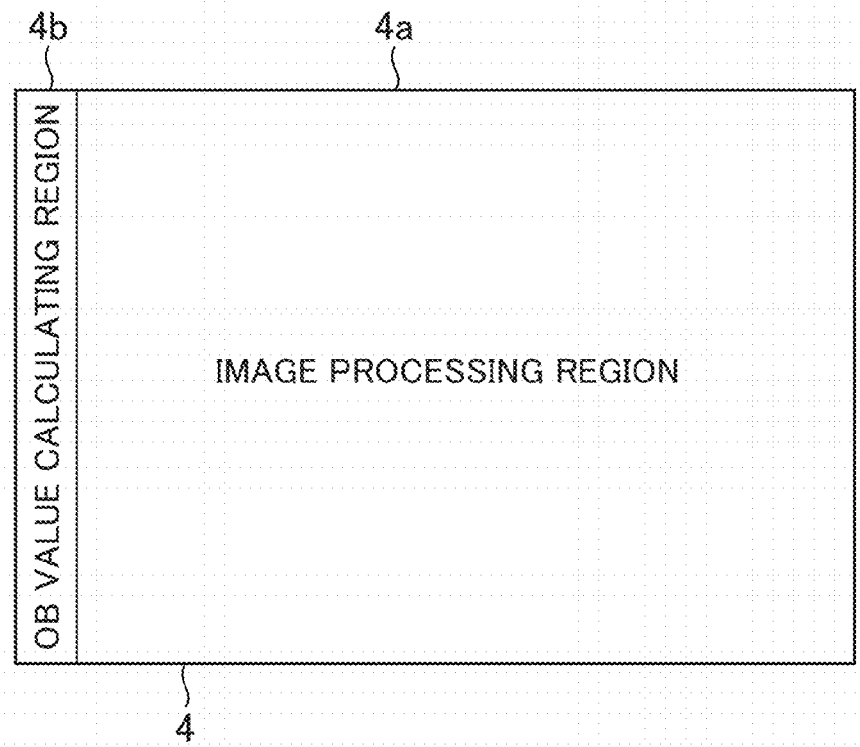
FIGS. 18A and B are a diagram showing variation of OB levels due to the respective production tolerances of image pickup apparatuses.
Figure 18B:
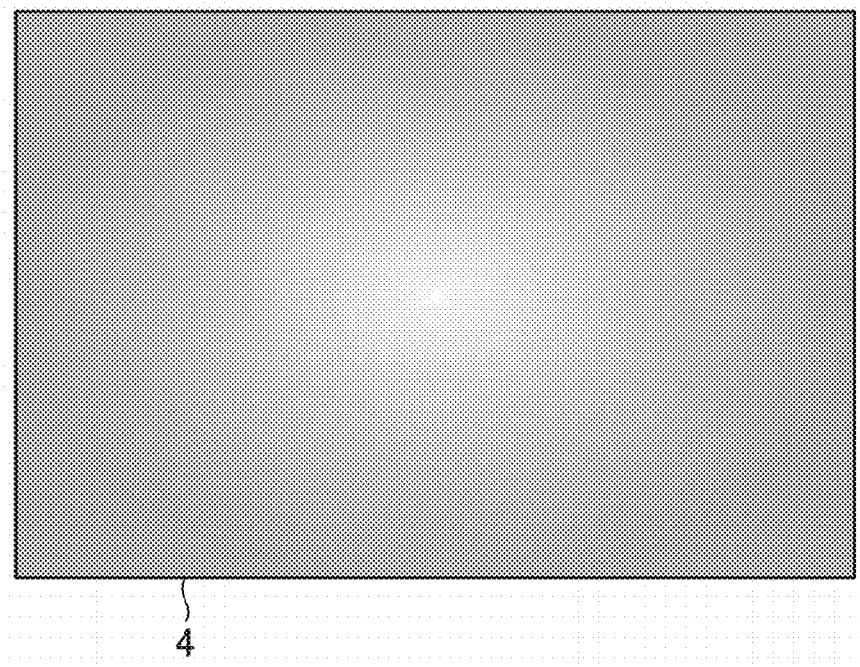

FIG. 18 is a diagram explaining detection of variation and unevenness of the OB values due to the respective production tolerances of image pickup apparatuses; in other words, detection of shading in the image. As shown in FIG. 18A, an image pickup surface of the image sensor 4 has an effective pixel region 4a and an OB pixel region 4b. Variation and unevenness in the OB values occur (OB shading) depending on a position of a pixel, as shown in FIG. 18B. Therefore an image signal of OB value calculating region (OB pixel region 4b) sometimes differs from that of an image signal processing region (effective pixel region 4a) in light-shielded photographing.

Figure 16:
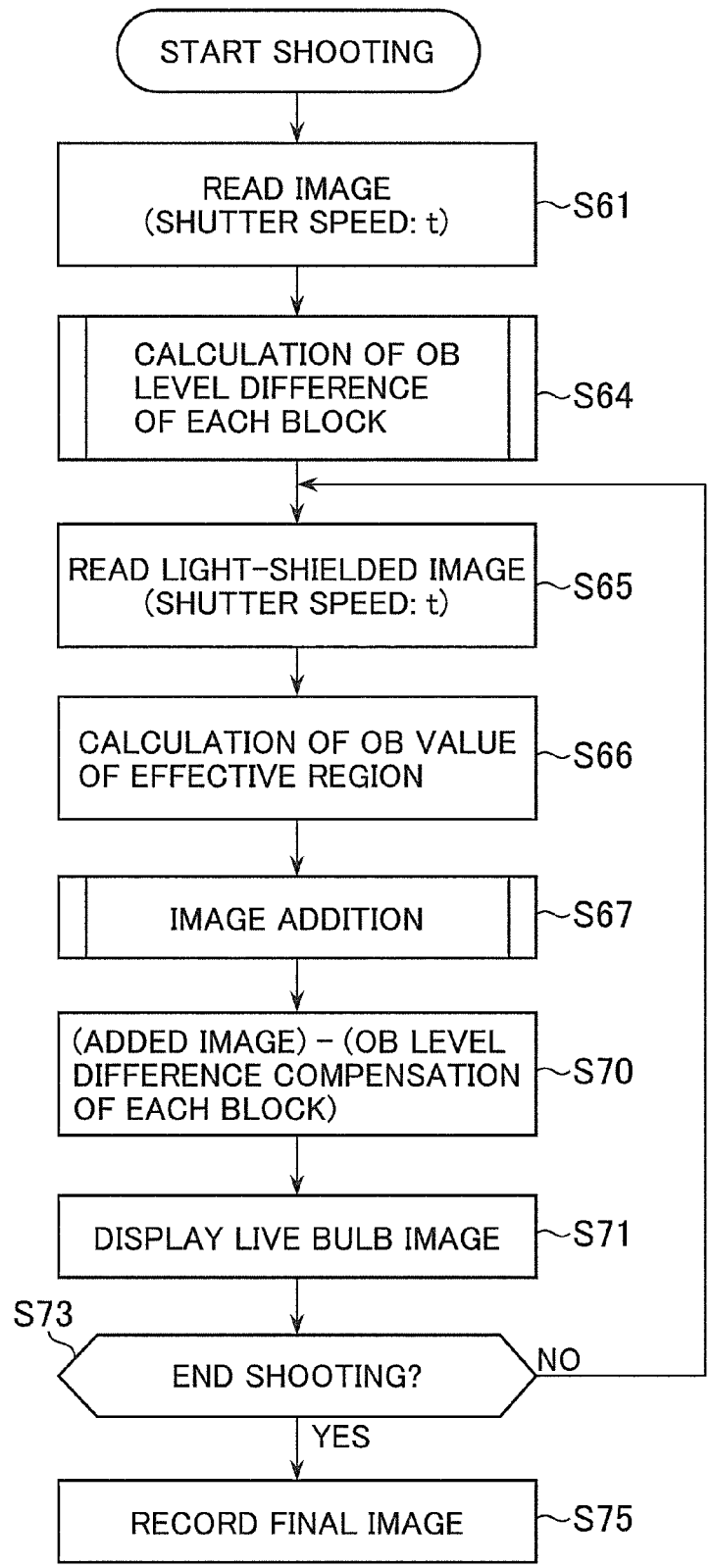
FIG. 16 is a diagram showing a procedure for synthesizing RAW image data in the camera according to a fourth embodiment of the invention.

First of all, a short light-shielded exposure is performed immediately before bulb shooting is started (S61 of FIG. 16). Next, an OB compensation value in accordance with each block is calculated using RAW image data and an OB value obtained by the short light-shielded exposure (S64 of FIG. 16, #53 and #55a of FIG. 17). For example, the pixels are divided into 256 blocks of 16 regions in width and 16 regions in height. A compensation value is calculated as follows, for example:

(A value of RAW image data in each block)−(OB value); or, alternatively, (A value of RAW image data in each block)/(OB value).

When OB subtraction is performed (#54 and #55a of FIG. 17), (a compensation amount)+(OB value) or (a compensation amount)*(OB value) is subtracted with respect to each pixel position in the each block of each RAW image data. Accordingly, image degradation due to OB shading can be prevented.

Next, synthesizing operation according to the fourth example embodiment will be described using FIG. 17. FIG. 17 shows image addition, OB compensation, and offset compensation.

At #53, light-shielded RAW data is obtained. The light-shielded RAW data is obtained when the light-shielded RAW data is read at step S61 of FIG. 16. The OB value 1 is subtracted from the RAW data 1 as was described above with reference to #54 of FIG. 10. However, compensation is performed in accordance with the position of the RAW image data as described above.

According to the fourth example embodiment, the OB value is compensated based on unevenness and variation of output when the effective pixels are light-shielded, as described above. According to the fourth example embodiment, when bulb shooting is performed, exposure is performed in a light-shielded state first of all (S61 of FIG. 16). After the exposure, data of shading in the image is obtained based on the image data read from the effective pixel region (Refer to FIG. 18(b).). Next, the added image data generated by the image synthesizing unit 11 is compensated using the data of shading in the image (#53 of FIG. 17) to prevent color differences.

Modification of Fourth Embodiment

Next, a modification of the fourth example embodiment will be described using FIG. 19. According to the second and third example embodiments, the light-shielded image data is read before bulb shooting is started (Recall, e.g., S61 of FIGS. 8 and 12). Offset compensation is performed using the OB level difference and shading data obtained by reading the light-shielded image in order to synthesize the added image data (S69 of FIG. 8, and FIG. 14). On the other hand, according to the modification, the light-shielded image data is read and offset compensation is performed after bulb shooting.

Figure 19:
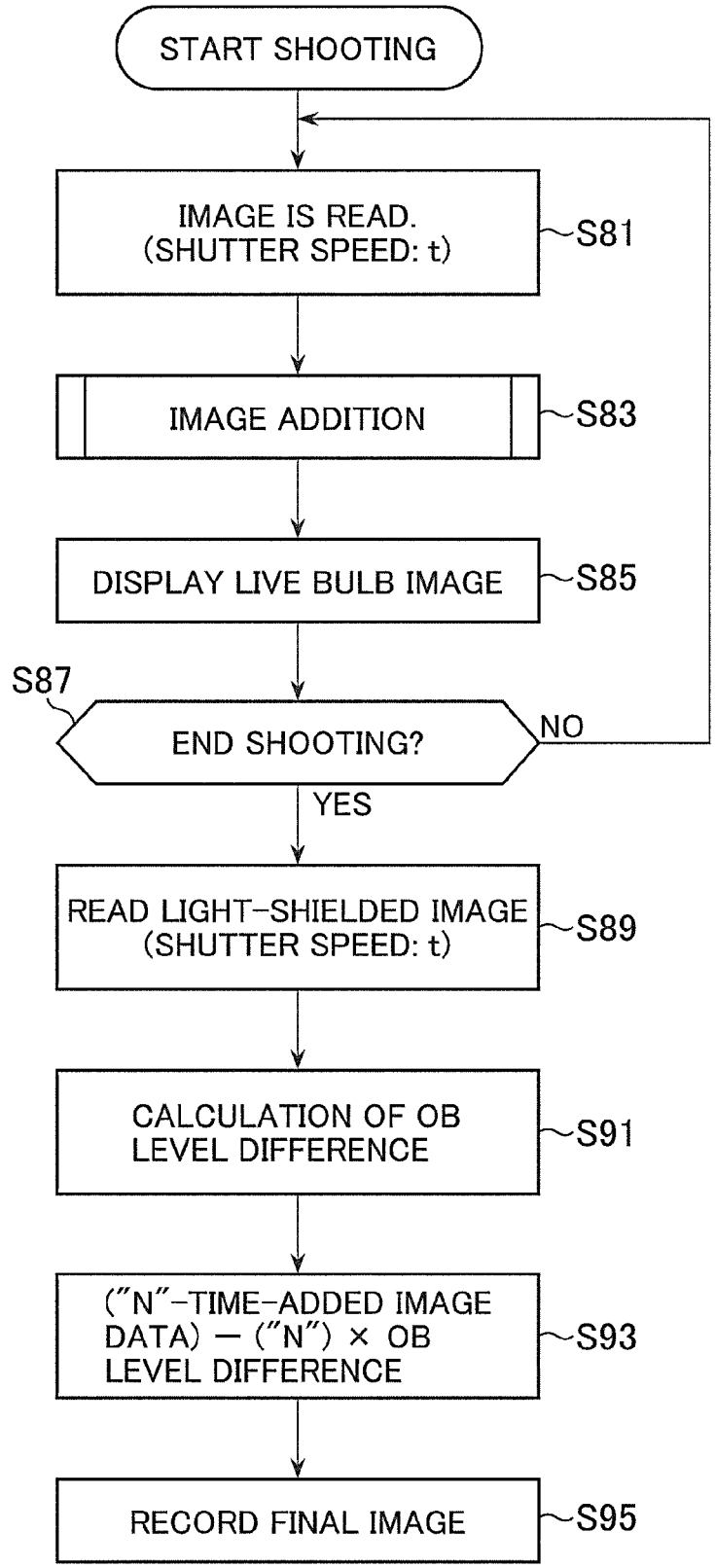
FIG. 19 is a flowchart showing a modified example of operations for generating an added image in the camera according to the second, third and fourth embodiments of the invention.

Bulb shooting shown in FIG. 19 is started and then (un-shielded) image data is read first at step S81. Next, image addition is performed at step S83 and then a live bulb image is displayed at step S85. Further it is determined whether or not shooting is continued at step S87. Since the operations of these steps are as same as those of steps S51 to S57 shown in FIG. 3 according to the first example embodiment, detailed description is omitted.

Figure 8:
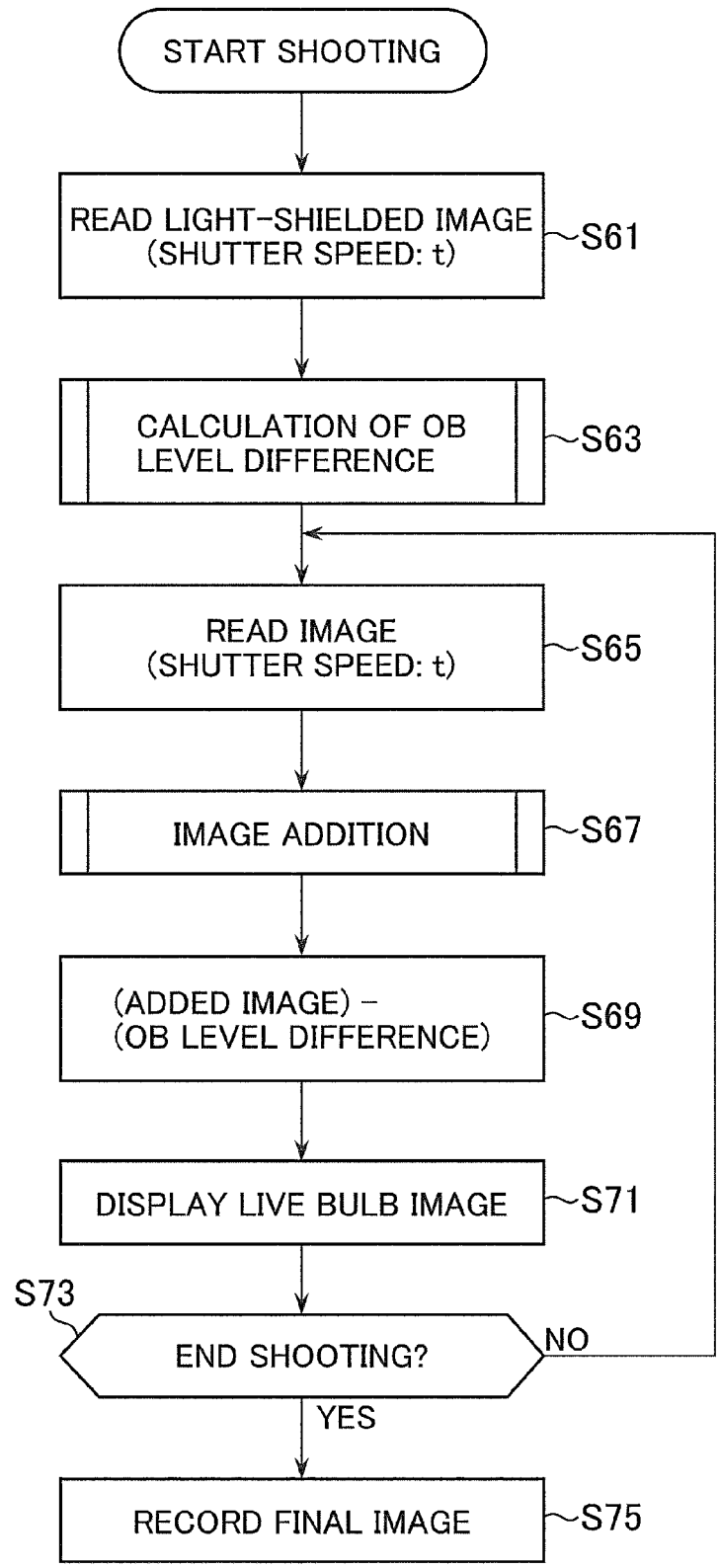
FIG. 8 is a flowchart showing operations of the camera for generating an added image in the bulb shooting mode according to a second embodiment of the invention.

If the result of determination in step S87 is that shooting is ended, light-shielded image is read (S89) (Recall, e.g., step S61 of FIG. 8). Subsequently, an OB level difference is calculated (S91) (Recall, e.g., step S63 of FIG. 8). At least one of (A) the OB level difference of the second example embodiment, or (B) shading in the image of the third example embodiment, is calculated in order to calculate the OB level difference.

After the OB level is calculated, the following calculation is performed (S93):

($N^{th}$ addition image)–"N"*(OB level difference)

Here a result of ("N"*OB level difference) is subtracted from added image finally obtained by bulb shooting (that is, the $N^{th}$ addition image. The OB level difference may be compensated in accordance with the number of addition operations. After offset compensation is performed, a final image data is recorded (S95). Here the added image data generated at step S93 is recorded in the external memory 21.

Similarly, according to the modification of the second and third example embodiments, the light-shielded image data may be read after bulb shooting is ended, rather than before bulb shooting is started. After that, compensations for OB level difference and OB level adjustment error are performed. Performing these operations after completing the bulb exposure advantageously reduces time lag from the operation of the release button to starting bulb shooting. Further, the live bulb image is quickly displayed since offset compensation is performed after bulb shooting is ended and calculation during bulb shooting is performed in short time.

As described above, the image pickup apparatus according to the embodiments and modification consistent with the present invention has the optical black pixel region (OB pixel region 4b) and the effective pixel region (effective pixel region 4a). The image sensor 4 (which repeatedly reads the image data at a predetermined time interval), the memory 11d (where the parts for subtraction and storing of the average value of OB output levels read from the OB pixel region are stored), and the image synthesizing unit 11 (where the image data read from the effective pixel region in the image sensor 4 from a sequence of incremental exposures are sequentially added together to generate the added image) are provided to the image pickup apparatus. The image synthesizing unit 11 subtracts the part of the average value of OB output levels stored in the memory 11d from the generated added-image or the image read from the effective pixel region (Refer to the subtractor 11b of FIG. 4, #57 of FIG. 5, and #54 and #55 of FIG. 10). After the subtractions, the memory 11d adds the part of the average value of OB output levels for storage to the average value of OB output levels (Refer to the memory 11c and the memory 11d of FIG. 4). When the live bulb image is displayed, color differences can be prevented in long exposures such as exposures during bulb shooting since the slight error of the OB compensation is reflected to the next compensation (i.e., in the OB compensation of the added incremental exposure).

According to the example embodiments and modifications consistent with the present invention, the average value of OB output levels is divided into the OB subtraction value and the saved value, and only the OB subtraction value is subtracted from the added image. However, a range to be compensated may be changed. For example, the added image data may have the number of bits up to one decimal place and OB compensation may be performed within the range. In this case, the memory 11d outputs values after two decimal places to the memory 11c.

According to the example embodiments and modifications consistent with the present invention, the bits after the decimal point of the average value of OB output levels are kept. However, the bits may be omitted as appropriate. Alternatively, OB compensation based on the OB level difference may be omitted, for example.

According to the example embodiments and modifications consistent with the present invention, bulb shooting is started when the user fully presses the release button and shooting is ended when a finger is taken away (i.e., when the second release switch is off). However, this method is not the only available one. For example, bulb shooting may be started when the user fully presses the release button. After that, bulb shooting is continued even if a finger is taken away, and bulb shooting is only ended when the user fully presses the release button again.

In the above embodiments, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc. It is possible to apply the present invention in any of the above configurations provided it is a device which obtains (video) images by an image sensor and performs OB compensation.

Also, regarding the operation flow in the patent claims, the specification and the drawings, for the sake of convenience description has been given using words representing sequence, such as "first" and "next", but at places where it is not particularly described, this does not mean that implementation must be in this order.

The invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
   a) an image sensor for repeatedly reading and outputting image data at predetermined time intervals;
   b) an image processing unit having an image synthesizer for creating combined image data based on the image data output by the image sensor; and
   c) an image memory for storing the combined image data created by the image synthesizer,
   wherein, the image synthesizer includes
   1) an input for receiving an average value of optical black output from a plurality of pixel output values of the image data,
   2) memory including a first storage section for storing the average value received, and a second storage section for storing a first value that is calculated as an integer portion of the average value from the first storage section, and storing a second value that is calculated as a decimal portion of the average value from the first storage section,
   3) an image addition section for generating cumulatively added image data by additive combination processing of (i) first image data constituted by pixel output values corresponding to an effective pixel region of the image sensor and (ii) second image data constituted by the combined image data that has been read out from the image memory, and
   4) an image compensation section for performing subtraction processing for subtracting the second value output by the first storage section of the memory, from respective pixel outputs contained in one of (A) the cumulative added image data, or (B) the first image data, wherein the first storage section performs addition processing for an average value of the optical black output and a previous second value stored in the second storage section, and wherein the image memory stores cumulatively added image data that has been created by the image adding section, or cumulatively added image data that has been subjected to subtraction processing by the image correction processing section, as the combined image data.

2. The imaging device of claim 1, wherein the average value for optical black output from a plurality of pixel output values received by the input of the image synthesizer corresponds to an optical black pixel region of the image sensor, included in the image data.

3. The imaging device of claim 2, further comprising:
d) a mechanical shutter for exposing or shielding a subject image on the imaging surface of the image sensor by operation of blocking or allowing light that is incident on the imaging surface of the image sensor; and
e) a controller for controlling the mechanical shutter so that the subject image to the imaging surface of the image sensor is exposed or in a shielded state, and for controlling read out of the image data from the image sensor,
wherein the image compensation section of the image synthesizer further includes
i) an optical black calculation section for calculating an average value of pixel output constituted by an effective pixel region from shielded image data acquired by the controller when controlling the mechanical shutter to the closed state and controlling read out of image data from the image sensor, and then outputting to the image memory the average data when the effective pixel region is shielded,
ii) an optical black output difference calculation section for calculating an optical black difference by subtracting the average value for optical black output that has been received by the input of the image synthesizer from an average value for pixel output when shielded that has been calculated by the optical black calculation section, and
wherein the image compensation section carries out subtraction processing of the second value that has been read out from the first storage section of the memory from respective pixel output contained in the first image data, and subtracts the optical black output difference from pixel output contained in the cumulatively added image data that has been read out from the image memory.

4. The imaging device of claim 2, wherein the image compensation section carries out subtraction processing of the first value from the second storage section of the memory, from the respective pixel outputs contained in the cumulatively added image data, and
wherein the image compensation section outputs cumulatively added image data that has been subjected to subtraction processing by the image correction section to the image memory as the combined image data.

5. The imaging device of claim 1, further comprising:
d) a mechanical shutter for exposing or shielding a subject image on the imaging surface of the image sensor by operation of blocking or allowing light that is incident on the imaging surface of the image sensor; and
e) a controller for controlling the mechanical shutter so that the subject image to the imaging surface of the image sensor is exposed or in a shielded state, and controlling read out of the image data from the image sensor,
wherein the image compensation section of the image synthesizing unit further includes an offset correction value calculating section for calculating an offset value for optical black output value determined based on number of combined images of the added image,
wherein the average value for optical black output from a plurality of pixel output values received by the input of the image synthesizer corresponds to an effective pixel region from shielded image data acquired by the controller when controlling the mechanical shutter to the closed state and controlling read out of image data from the image sensor, and then outputs the average data when the effective pixel region is shielded to the image memory,
wherein the memory stores an integer part of the average data when effective pixel region is shielded that has been stored in the image memory in the first storage section as a first value, and stores a decimal part of the calculated average value as a second value in the second storage section, and
wherein the image compensation section (1) carries out subtraction processing of the first value that has been read out from the first storage section of the memory from respective pixel output contained in the first image data, and (2) generates the second cumulatively added image data image by adding the optical black output value compensation value to pixel output contained in the cumulatively added image data that was generated by the image adding section.

6. The imaging device of claim 1, wherein:
a number of bits of the carry over part of the average value of the optical black pixel output, stored in the first storage section, is determined by the following equation:
number of bits of a decimal part $Log_2 N$, where N is the maximum number of added images determined at the time of image addition.

* * * * *